(12) United States Patent
Kouda

(10) Patent No.: US 12,166,390 B2
(45) Date of Patent: Dec. 10, 2024

(54) ELECTRIC WORK MACHINE

(71) Applicant: MAKITA CORPORATION, Anjo (JP)

(72) Inventor: Kei Kouda, Anjo (JP)

(73) Assignee: MAKITA CORPORATION, Anjo (JP)

( * ) Notice: Subject to any disclaimer, the term of this patent is extended or adjusted under 35 U.S.C. 154(b) by 317 days.

(21) Appl. No.: 17/929,802

(22) Filed: Sep. 6, 2022

(65) Prior Publication Data

US 2023/0076631 A1  Mar. 9, 2023

(30) Foreign Application Priority Data

Sep. 9, 2021  (JP) .................................. 2021-147103

(51) Int. Cl.
| | |
|---|---|
| H02K 21/12 | (2006.01) |
| B27B 17/08 | (2006.01) |
| H02K 1/278 | (2022.01) |
| H02K 3/34 | (2006.01) |
| H02K 7/14 | (2006.01) |
| H02K 11/215 | (2016.01) |
| B27B 17/02 | (2006.01) |

(52) U.S. Cl.
CPC ............ *H02K 21/12* (2013.01); *B27B 17/08* (2013.01); *H02K 1/278* (2013.01); *H02K 3/34* (2013.01); *H02K 7/145* (2013.01); *H02K 11/215* (2016.01); *B27B 17/02* (2013.01)

(58) Field of Classification Search
CPC ........... B25F 5/00; B27B 17/02; B27B 17/08; H02K 1/278; H02K 11/215; H02K 21/12; H02K 3/34; H02K 7/145
See application file for complete search history.

(56) References Cited

U.S. PATENT DOCUMENTS

| | | | | |
|---|---|---|---|---|
| 2016/0226339 | A1* | 8/2016 | Niwa | ........................ H02K 1/27 |
| 2016/0336838 | A1* | 11/2016 | Kouda | .................... H02K 1/146 |
| 2019/0348877 | A1* | 11/2019 | Kouda | .................... H02K 1/276 |
| 2021/0091640 | A1* | 3/2021 | Aoyama | ................ H02K 7/145 |

FOREIGN PATENT DOCUMENTS

| | | |
|---|---|---|
| JP | 2017038462 A | 2/2017 |
| JP | 2019180165 A | 10/2019 |

OTHER PUBLICATIONS

Unpublished U.S. Appl. No. 17/890,434.

* cited by examiner

*Primary Examiner* — Naishadh N Desai
(74) *Attorney, Agent, or Firm* — J-TEK LAW PLLC; Jeffrey D. Tekanic; Scott T. Wakeman

(57) ABSTRACT

An electric work machine (1) includes: a brushless motor having a stator disposed around a rotor (30); and an output part driven by the rotor. The rotor has a rotor core (31) and first and second magnetic-pole parts (34S, 34N) disposed around a circumferential direction of the rotor core. When the induced voltage of the brushless motor is given as Va, the power-supply voltage of the brushless motor is given as Vb, the rotational speed of the brushless motor is given as ω, a first induced voltage constant, which is expressed by Va/ω, is given as Ea [V/krpm], a pole-pairs count, which is the number of the first magnetic-pole parts or the second magnetic-pole parts, is given as Pi, and a second induced voltage constant, which is expressed as Ea/Pi, is given as Eb [V/krpm·pole-pairs count], the motor satisfies the condition: Eb≤0.025×Vb.

20 Claims, 28 Drawing Sheets

FIG. 28

|  | Dimensions of Each Permanent Magnet | | Total Peripheral Length | Total Peripheral Length Percentage | (1/Total Peripheral Length Percentage)$^2$ | Eddy-Current Loss Percentage |
|---|---|---|---|---|---|---|
|  | Wm | Lm |  |  |  |  |
| No segmentation | 10.7 | 26.4 | 74.2 | 100 | 100 | 100 |
| Transverse segmentation: 2 | 10.7 | 13.2 | 95.6 | 128.841 | 60.24097967 | 65.7355 |
| Transverse segmentation: 4 | 10.7 | 6.6 | 138.4 | 186.5229 | 28.74323399 | 30.02371 |
| Transverse segmentation: 6 | 10.7 | 4.4 | 181.2 | 244.2049 | 16.76839222 | 12.11412 |
| Longitudinal segmentation: 2 | 5.35 | 26.4 | 127 | 171.159 | 34.13503627 | 29.87385 |

FIG. 29
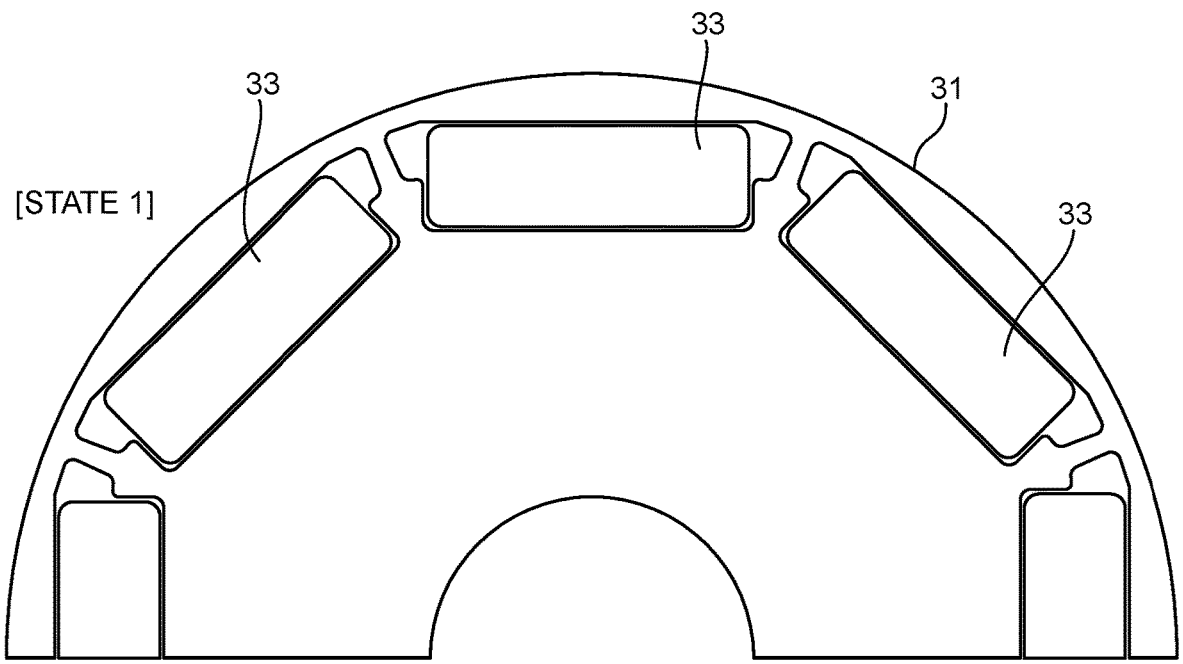
[STATE 1]
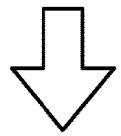
[STATE 2]
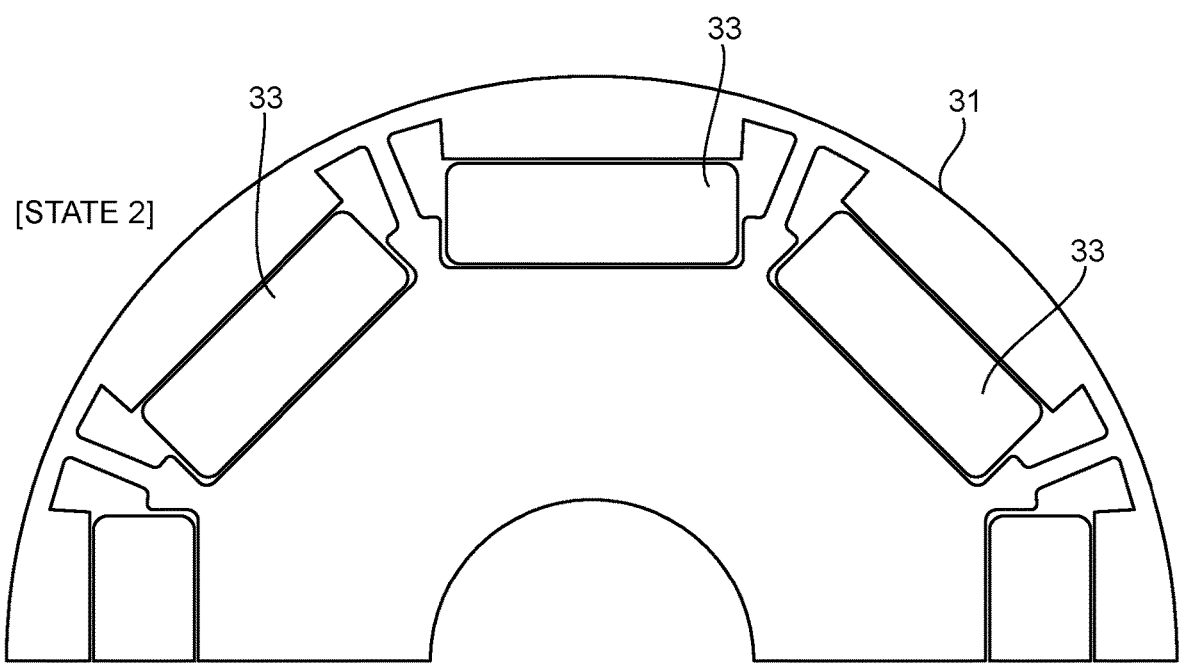

ELECTRIC WORK MACHINE

CROSS-REFERENCE

This application claims priority to Japanese Patent Application No. 2021-147103 filed on Sep. 9, 2021, the contents of which are incorporated herein by reference.

TECHNICAL FIELD

Techniques disclosed in the present specification relate to an electric work machine.

BACKGROUND ART

An air compressor comprising an electric motor is disclosed in Japanese Laid-open Patent Publication 2017-038462.

SUMMARY OF THE INVENTION

During operation of a brushless motor, there is a possibility that eddy-current losses will occur within the permanent magnets of the rotor. When eddy-current losses occur, heat is generated in the permanent magnets and thus the temperature of the permanent magnets rises; as a result, there is a possibility that the magnetic forces of the permanent magnets will decrease, because the magnetic fields generated by the permanent magnets decrease with increasing temperatures of the permanent magnets. If the magnetic forces of the permanent magnets decrease, there is a possibility that the performance of the motor will decrease.

One non-limiting object of the present teachings is to disclose techniques for improving performance of an electric motor, e.g., by reducing eddy-current losses during operation.

In one aspect of the present teachings, an electric work machine may comprise: an inner-rotor-type brushless motor comprising a rotor and a stator, which is disposed around the rotor; and an output part, which is directly or indirectly driven by the rotor. The rotor may comprise a rotor core and a plurality of magnetic-pole parts disposed in (around) a circumferential direction of the rotor core. The stator may comprise: a stator core; one or more insulators, which is (are) fixed to the stator core; and coils, which are wound on teeth of the stator core via the insulator(s). The magnetic-pole parts may comprise first magnetic-pole parts and second magnetic-pole parts, which are disposed alternately (in an alternating manner) in (around) the circumferential direction; the magnetic poles of the first and second magnetic-pole parts differ from each other. Each one of the magnetic-pole parts may comprise a plurality of (discrete, separate) permanent magnets. When the induced voltage of the brushless motor is given as Va, the power-supply voltage of the brushless motor is given as Vb, the rotational speed of the brushless motor is given as ω, a first induced voltage constant, which is expressed (calculated) by (as) the equation Va/ω, is given as Ea [V/krpm], a pole-pairs count, which indicates (is defined as) the number of the first magnetic-pole parts or of the second magnetic-pole parts (i.e. as the number of pairs of the first and second magnetic-pole parts), is given as Pi, and a second induced voltage constant, which is expressed by Ea/Pi, is given as Eb [V/krpm·pole-pairs count], the following condition is preferably satisfied: $Eb \leq 0.025 \times Vb$. As used herein, the abbreviation "krpm" means "kilorevolutions per minute".

According to the techniques disclosed in the present specification, improved performance of an electric motor can be achieved.

BRIEF DESCRIPTION OF THE DRAWINGS

FIG. 28 is a table that shows the relationships among segment count, total peripheral length, total peripheral length percentage, and eddy loss percentage according to the first embodiment.

FIG. 29 is a conceptual diagram for explaining a "submerged amount" according to a second embodiment.

DETAILED DESCRIPTION OF THE INVENTION

Figure 1:
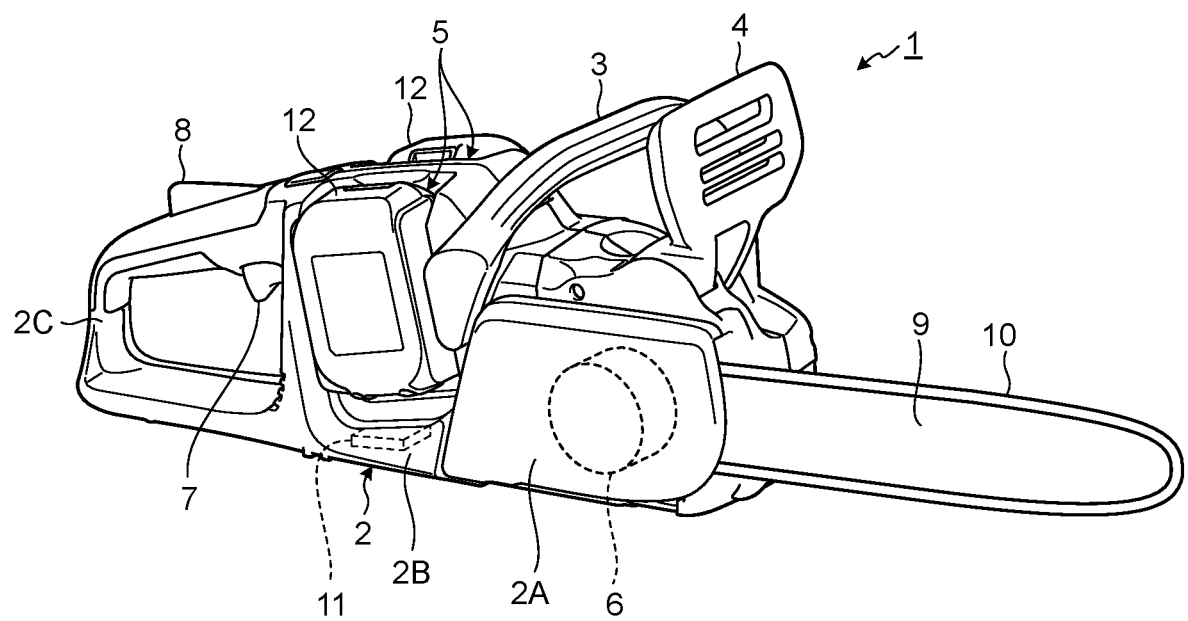
FIG. 1 is an oblique view that shows an electric work machine according to a first embodiment of the present teachings.

In one or more of the embodiments, an electric work machine may comprise: an inner-rotor-type brushless motor comprising a rotor and a stator, which is disposed around (surrounding) the rotor; and an output part, which is directly or indirectly driven by the rotor. The rotor may comprise a rotor core and a plurality of magnetic-pole parts disposed in (around, along) a circumferential direction of the rotor core. The stator may comprise: a stator core; one or more insulators, which is (are) fixed to the stator core; and coils, which are wound on teeth of the stator core via the insulator(s). The magnetic-pole parts may comprise first magnetic-pole parts and second magnetic-pole parts, which are disposed alternately in the circumferential direction; the magnetic poles of the first and second magnetic-pole parts differ from each other. Each one of the magnetic-pole parts may comprise a plurality of (discrete, separate) permanent magnets.

According to the above-mentioned configuration, eddy-current losses can be reduced by constituting each one of the magnetic-pole parts as a plurality of the permanent magnets, e.g., with a small gap therebetween. Consequently, a rise in the temperature of the permanent magnets during operation can be reduced, thereby avoiding a reduction in the magnetic forces of the permanent magnets during operation. Accordingly, motor performance can be maintained during operation.

In one or more of the embodiments, when the induced voltage of the brushless motor is given as Va, the power-supply voltage of the brushless motor is given as Vb, the rotational speed of the brushless motor is given as $\omega$, a first induced voltage constant, which is expressed (calculated) by (as) Va/$\omega$, is given as Ea [V/krpm], a pole-pairs count, which indicates (is defined as) the number of the first magnetic-pole parts or of the second magnetic-pole parts (i.e. the number of pairs of the first and second magnetic-pole parts), is given as Pi, and a second induced voltage constant, which is expressed (calculated) by (as) Ea/Pi, is given as Eb [V/krpm·pole-pairs count], the following condition may be satisfied: Eb≤0.025×Vb. Again, herein, the abbreviation "krpm" means "kilorevolutions per minute).

According to the above-mentioned configuration, eddy-current losses can be reduced in a brushless motor, which is suitably used in the electric work machine. One exemplary example of a brushless motor that satisfies the above-mentioned condition is a brushless motor having a pole count, which indicates the total number of magnetic-pole parts, of eight and a rotational speed $\omega$ of 10,000 rpm or more.

In one or more of the embodiments, in each one of the magnetic-pole parts, a plurality of the (discrete, separate) permanent magnets may be disposed (adjacent or in parallel to each other) in an axial direction. Preferably, a gap is provided between each of the permanent magnets disposed in the axial direction such that eddy currents from one of the permanent magnets can not pass or be conducted to the adjacent permanent magnet(s). In other words, there is a seam or spacing between adjacent permanent magnets in the axial direction. The gap may be filled with air or a material other than the material of the permanent magnet, such as e.g., an electrically insulating material.

According to the above-mentioned configuration eddy-current losses can be reduced by constituting each one of the magnetic-pole parts as a plurality of discrete permanent magnets disposed (adjacent or in parallel to each other) in the axial direction. The number of discrete permanent magnets disposed (adjacent or in parallel to each other) in the axial direction may be two, may be three, may be four, or may be an arbitrary plurality of five or more. Within each magnetic-pole part, all of the discrete permanent magnets are disposed in a coplanar manner.

In one or more of the embodiments, each one of the magnetic-pole parts may comprise at least three discrete permanent magnets disposed (adjacent or in parallel to each other) in the axial direction.

In the above-mentioned configuration, eddy-current losses can be reduced by constituting each one of the magnetic-pole parts as at least three discrete permanent magnets disposed (adjacent or in parallel to each other) in the axial direction.

In one or more of the embodiments, the stator core may comprise pole arcs, which protrude in the circumferential direction from inner-end portions of the teeth in the radial direction. When an opening width (in millimeters), which indicates (is defined as) the distance between a first pole arc of a first tooth and a second pole arc, which is disposed adjacent to the first pole arc, of a second tooth disposed adjacent to the first tooth, is given as Wa, and a magnet width, which indicates (is defined as) the dimension (length in millimeters) of the permanent magnet in a tangential direction of the rotor, is given as Wm, the following condition may be satisfied: 0.2≤Wa/Wm.

According to the above-mentioned configuration, eddy-current losses can be effectively reduced. That is, under the condition of [0.2≤Wa/Wm], eddy-current losses tend to increase. However, even under the condition of [0.2≤Wa/Wm], eddy-current losses can be effectively reduced by constituting each one of the magnetic-pole parts as at least three discrete permanent magnets disposed (adjacent or in parallel to each other) in the axial direction.

In one or more of the embodiments, each one of the magnetic-pole parts may comprise at least two discrete permanent magnets disposed (adjacent or in parallel to each other) in the axial direction.

In the above-mentioned configuration, eddy-current losses can be reduced by constituting each one of the magnetic-pole parts as at least two discrete permanent magnets disposed (adjacent or in parallel to each other) in the axial direction.

In one or more of the embodiments, the stator core may comprise pole arcs, which protrude in the circumferential direction from inner-end portions of the teeth in the radial direction. When an opening width (in millimeters), which indicates (is defined as) the distance between a first pole arc of a first tooth and a second pole arc, which is disposed adjacent to the first pole arc, of a second tooth disposed adjacent to the first tooth, is given as Wa, and a magnet width, which indicates (is defined as) the dimension (length in millimeters) of the permanent magnet in a tangential direction of the rotor, is given as Wm, the following condition may be satisfied: $0.3 \leq Wa/Wm$.

According to the above-mentioned configuration, eddy-current losses can be effectively reduced. That is, under the condition of $[0.3 \leq Wa/Wm]$, eddy-current losses tend to increase. However, even under the condition of $[0.3 \leq Wa/Wm]$, eddy-current losses can be effectively reduced by constituting each one of the magnetic-pole parts as at least two discrete permanent magnets disposed (adjacent or in parallel to each other) in the axial direction.

In one or more of the embodiments, a pole count, which indicates (is defined as) the total number of the magnetic-pole parts, may be six or more (at least six).

According to the above-mentioned configuration, eddy-current losses can be effectively reduced. That is, if the pole count of six or more, eddy-current losses tend to increase. However, even if the pole count of six or more, eddy-current losses can be effectively reduced by constituting each one of the magnetic-pole parts as a plurality of discrete permanent magnets.

In one or more of the embodiments, when a magnet length (in millimeters), which indicates (is defined as) the dimension of the permanent magnets in the axial direction of the rotor, is given as Lm and the pole count, which indicates (is defined as) the total number of the magnetic-pole parts, is given as Pn, the following condition may be satisfied: $2 \times (Wm+Lm/Pn) \times Pn \geq 2 \times (Wm/Pn+Lm) \times Pn$.

According to the above-mentioned configuration, by constituting each one of the magnetic-pole parts as a plurality of discrete permanent magnets disposed (adjacent or in parallel to each other) in the axial direction, eddy-current losses can be effectively reduced.

In one or more modified embodiments, in each one of the magnetic-pole parts, the plurality of discrete permanent magnets may be disposed (adjacent or in parallel to each other) in the circumferential direction. In other words, each magnetic-pole part may comprise two or more discrete permanent magnets that are longitudinally separated along the axial direction, such that two or more discrete permanent magnets extend in parallel in the axial (longitudinal) direction of the rotor. Preferably, a gap is provided between each of the discrete (longitudinally segmented) permanent magnets extending in parallel in the axial direction such that eddy currents from one of the permanent magnets can not pass or be conducted to the adjacent permanent magnet(s). In other words, there is a seam or spacing between adjacent permanent magnets that extends along the axial direction. The gap may be filled with air or a material other than the material of the permanent magnet, such as e.g., an electrically insulating material.

According to the above-mentioned configuration, eddy-current losses can be reduced by constituting each one of the magnetic-pole parts as a plurality of discrete permanent magnets disposed (adjacent or in parallel to each other) in the circumferential direction. The number of discrete permanent magnets disposed (adjacent or in parallel to each other) in the circumferential direction may be two, may be three, may be four, or may be an arbitrary plurality of five or more. Within each magnetic-pole part, all of the discrete permanent magnets are disposed in a coplanar manner.

In one or more of the modified embodiments, each one of the magnetic-pole parts may comprise at least two discrete permanent magnets disposed (adjacent to each other) in the circumferential direction.

In the above-mentioned configuration, eddy-current losses can be reduced by constituting each one of the magnetic-pole parts as at least two of the permanent magnets disposed (adjacent or in parallel to each other) in the circumferential direction.

In one or more of the embodiments, the stator core may comprise pole arcs, which protrude in the circumferential direction from inner-end portions of the teeth in the radial direction. When an opening width (in millimeters), which indicates (is defined as) the distance between a first pole arc of a first tooth and a second pole arc, which is disposed adjacent to the first pole arc, of a second tooth disposed adjacent to the first tooth, is given as Wa, and a magnet width (in millimeters), which indicates (is defined as) the dimension (length) of the permanent magnet in a tangential direction of the rotor, is given as Wm, the following condition may be satisfied: $0.2 \leq Wa/Wm$.

According to the above-mentioned configuration, eddy-current losses can be effectively reduced. That is, under the condition of $[0.2 \leq Wa/Wm]$, eddy-current losses tend to increase. However, even under the condition of $[0.2 \leq Wa/Wm]$, eddy-current losses can be effectively reduced by constituting each one of the magnetic-pole parts as at least two of the permanent magnets disposed (adjacent or in parallel to each other) in the circumferential direction.

In one or more of the embodiments, the pole count, which indicates (is defined as) the total number of the magnetic-pole parts, may be six or more.

According to the above-mentioned configuration, eddy-current losses can be effectively reduced. That is, if pole count of six or more, eddy-current losses tend to increase. However, even if the pole count of six or more, eddy-current losses can be effectively reduced by constituting each one of the magnetic-pole parts as a plurality of discrete permanent magnets.

In one or more of the embodiments, when a magnet length (in millimeters), which indicates (is defined as) the dimension of the permanent magnets in the axial direction of the rotor, is given as Lm and the pole count, which indicates (is defined as) the total number of the magnetic-pole parts, is given as Pn, the following condition may be satisfied: $2 \times (Wm/Pn+Lm) \times Pn \geq 2 \times (Wm+Lm/Pn) \times Pn$.

According to the above-mentioned configuration, by constituting each one of the magnetic-pole parts as a plurality of discrete permanent magnets disposed (adjacent or in parallel to each other) in the circumferential direction, eddy-current losses can be effectively reduced.

In one or more of the embodiments, an electric work machine may comprise: an inner-rotor-type brushless motor comprising a rotor and a stator, which is disposed around the rotor; and an output part, which is directly or indirectly driven by the rotor. The rotor may comprise rotor core and a plurality of magnetic-pole parts disposed in a circumferential direction of the rotor core. The stator may comprise: a stator core; one or more insulators, which is (are) fixed to the stator core; and coils, which are wound on teeth of the stator core via the insulator(s). The magnetic-pole parts may comprise first magnetic-pole parts and second magnetic-pole parts, which are disposed alternately in the circumferential direction; the magnetic poles of the first and second magnetic-pole parts differ from each other. The magnetic-pole parts may comprise permanent magnets, which are disposed in the interior of the rotor core. When the pole count, which indicates (is defined as) the total number of the magnetic-pole parts, is given as Pn and the angle formed between the permanent magnets of the first magnetic-pole parts and the permanent magnets of the second magnetic-pole parts that are adjacent to each other is given as θ, the following condition may be satisfied: θ=180 [°]×(Pn−2)/Pn.

According to the above-mentioned configuration, eddy-current loss can be reduced by constituting each one of the magnetic-pole parts as the permanent magnets disposed (extending) in tangential directions of the rotor core. Consequently, the temperature of the permanent magnets is less prone to rise during operation of the electric motor, thereby avoiding a decrease in the magnetic forces of the permanent magnets during operation. Accordingly, improved performance of the motor can be achieved.

In one or more of the embodiments, the rotor core may comprise magnet holes, in which the permanent magnets are respectively disposed. Each of the magnet holes may have an outer-side support surface, which faces radially outward and opposes (faces) an outer surface of the corresponding permanent magnet(s). In each of the magnet holes, a gap may be formed radially outward of the outer-side support surface. A bridge part of the rotor core may be disposed between the outer surface of the rotor core and an outer-end portion of the gap in the radial direction. When a second virtual line, which extends in a direction parallel to the outer-side support surface and passes through a point of intersection between a virtual circle, which passes through an inner-end portion of the bridge part in the radial direction, and a first virtual line, which passes through an edge of the outer-side support surface such that the first virtual line is orthogonal to the outer-side support surface, is given as reference line Lr, a distance in a radial direction between the reference line Lr and the outer-side support surface is given as submerged amount Da, and an outer diameter of the rotor core is given as Dr, the following condition may be satisfied: 0.017≤Da/Dr.

According to the above-mentioned configuration, eddy-current loss can be reduced by shifting (moving) the locations of the permanent magnets radially inward.

In one or more of the embodiments, the stator core may comprise pole arcs, which protrude in the circumferential direction from inner-end portions of the teeth in the radial direction. When an opening width (in millimeters), which indicates (is defined as) the distance between a first pole arc of a first tooth and a second pole arc, which is disposed adjacent to the first pole arc, of a second tooth disposed adjacent to the first tooth, is given as Wa, and a magnet width (in millimeters), which indicates (is defined as) the dimension of the permanent magnet(s) in tangential directions of the rotor, is given as Wm, the following condition may be satisfied: 0.2≤Wa/Wm.

According to the above-mentioned configuration, eddy-current losses can be effectively reduced. That is, under the condition of [0.2≤Wa/Wm], eddy-current losses tend to increase. However, even under the condition of [0.2≤Wa/Wm], eddy-current losses can be effectively reduced by shifting the locations of the permanent magnets radially inward.

In one or more of the embodiments, the pole count, which indicates the total number of the magnetic-pole parts, may be six or more.

According to the above-mentioned configuration, eddy-current losses can be effectively reduced. That is, if the pole count of six or more, eddy-current losses tend to increase. However, even if the pole count of six or more, eddy-current losses can be effectively reduced by shifting the locations of the permanent magnets radially inward.

In one or more of the embodiments, an electric work machine may comprise: an inner-rotor-type brushless motor comprising a rotor and a stator, which is disposed around the rotor; and an output part, which is directly or indirectly driven by the rotor. The rotor may comprise a rotor core and a plurality of magnetic-pole parts disposed in a circumferential direction of the rotor core. The stator may comprise: a stator core; one or more insulators, which is (are) fixed to the stator core; and coils, which are wound on teeth of the stator core via the insulator(s). The magnetic-pole parts may comprise first magnetic-pole parts and second magnetic-pole parts, which are disposed alternately in the circumferential direction; the magnetic poles of the first and second magnetic-pole parts differ from each other. The magnetic-pole parts may comprise permanent magnets, which are fixed to the rotor core. The rotor core may have: a shaft opening, in which a rotor shaft is disposed; and a plurality of holes formed in a radial direction between the shaft opening and an outer surface of the rotor core. In other words, the plurality of holes, which may be through holes or blind holes, extend in parallel to the axial direction (rotational axis or shaft opening) of the rotor and are disposed, in a radial direction, between the shaft opening and an outer circumference of the rotor.

According to the above-mentioned configuration, when the rotor rotates, air circulates through the holes. Thereby, the permanent magnets can be cooled by this air during operation, thereby curtailing a temperature rise and thus a decrease in the magnetic forces of the permanent magnets. Accordingly, a motor performance can be improved.

In one or more of the embodiments, each one of the magnetic-pole parts may comprise a plurality of discrete permanent magnets.

According to the above-mentioned configuration, eddy-current losses can be reduced by constituting each one of the magnetic-pole parts as a plurality of discrete permanent magnets.

In one or more of the embodiments, the stator core may comprise pole arcs, which protrude in the circumferential direction from inner-end portions of the teeth in the radial direction. When an opening width (in millimeters), which indicates (is defined as) the distance between a first pole arc of a first tooth and a second pole arc, which is disposed adjacent to the first pole arc, of a second tooth disposed adjacent to the first tooth, is given as Wa, and a magnet width (in millimeters), which indicates (is defined as) the dimension (length) of the permanent magnets in tangential directions of the rotor, is given as Wm, the following condition may be satisfied: 0.2≤Wa/Wm.

According to the above-mentioned configuration, an excessive rise in the temperature of the permanent magnets during operation can be avoided. That is, under the condition of [0.2≤Wa/Wm], eddy-current losses tend to increase, thereby causing the temperature of the permanent magnets to rise. However, even under the condition of [0.2≤Wa/Wm], a rise in the temperature of the permanent magnets during operation can be curtailed owing to the air that circulates in the holes.

In one or more of the embodiments, the pole count, which indicates (is defined as) the total number of the magnetic-pole parts, may be six or more.

According to the above-mentioned configuration, a rise in the temperature of the permanent magnets can be curtailed. That is, if the pole count of six or more, eddy-current losses tend to increase, and thereby the temperature of the permanent magnets tends to rise. However, even if the pole count of six or more, a rise in the temperature of the permanent magnets during operation can be curtailed owing to the air that circulates in the holes.

In one or more of the embodiments, the pole count, which indicates (is defined as) the total number of the magnetic-pole parts, may be larger than a slot count, which indicates (is defined as) the total number of the coils.

According to the above-mentioned configuration, motor performance can be effectively improved. When the pole count is greater than the slot count, eddy-current losses tend to increase. However, even if the pole count is greater than the slot count, eddy-current losses can be effectively reduced by the use of the configuration described above.

In one or more of the embodiments, the pole count may be eight; and the slot count may be six.

According to the above-mentioned configuration, motor performance can be effectively improved. When the pole count is eight and the slot count is six, there is a possibility that eddy-current losses will occur. However, even if the pole count is eight and the slot count is six, eddy-current losses can be effectively reduced by the use of the configuration described above.

Embodiments according to the present disclosure will be explained in detail below, with reference to the drawings, but the present disclosure is not limited to such embodiments. Structural elements of the embodiments explained below can be combined where appropriate. In addition, there are also embodiments in which some of the structural elements need not be used.

In the embodiments, positional relationships among the various parts are explained using the terms "left," "right," "front," "rear," "up," and "down." These terms indicate relative position or direction, with the center of the electric work machine as a reference.

The electric work machine comprises the motor. In the embodiments, a direction parallel to rotational axis AX of the motor is called an axial direction where appropriate. A radial direction of rotational axis AX of the motor is called a radial direction where appropriate. A direction that goes around rotational axis AX of the motor is called a circumferential direction or a rotational direction where appropriate. A direction parallel to a tangent of a virtual circle that is centered on rotational axis AX of the motor is called a tangential direction where appropriate.

In the radial direction, a location that is proximate to or a direction that approaches rotational axis AX of the motor is called inward in the radial direction where appropriate, and a location that is distant from or a direction that leads away from rotational axis AX of the motor is called outward in the radial direction where appropriate. A location on one side or a direction on one side of the circumferential direction is called one side in the circumferential direction where appropriate, and a location on the other side or a direction on the other side of the circumferential direction is called the other side in the circumferential direction where appropriate. A location on one side or a direction on one side of the tangential direction is called one side in the tangential direction where appropriate, and a location on the other side or a direction on the other side of the tangential direction is called the other side in the tangential direction where appropriate.

First Embodiment

A first embodiment of the present teachings will now be explained.

Electric Work Machine

FIG. 1 is an oblique view that shows an electric work machine 1 according to one representative, non-limiting embodiment of the present teachings. In the present embodiment, the electric work machine 1 is a chain saw, which is one type of horticultural tool (outdoor power equipment or "OPE") that falls within the general category of power tools.

The electric work machine 1 comprises a housing 2, a front-grip part 3, a hand guard 4, battery-mounting parts 5, a motor 6, a trigger switch 7, a trigger-lock lever 8, a guide bar 9, a saw chain 10, and a controller 11.

The housing 2 is formed of a synthetic resin (polymer). The housing 2 comprises a motor-housing part 2A, a battery-holding part 2B, and a rear-grip part 2C.

The motor-housing part 2A houses the motor 6. The battery-holding part 2B is connected to a rear portion of the motor-housing part 2A. The battery-mounting parts 5 are disposed on the battery-holding part 2B. The battery-holding part 2B houses the controller 11. The rear-grip part 2C is connected to a rear portion of the battery-holding part 2B.

The front-grip part 3 is formed of a synthetic resin (polymer). The front-grip part 3 is a pipe-shaped member. The front-grip part 3 is connected to the battery-holding part 2B. Opposite-end portions of the front-grip part 3 are each connected to respective surfaces of the battery-holding part 2B. A user can perform work using the electric work machine 1 in the state in which the user grips the front-grip part 3 and the rear-grip part 2C with their hands.

The hand guard 4 is disposed forward of the front-grip part 3. The hand guard 4 is fixed to the motor-housing part 2A. The hand guard 4 protects the user's hand that grips the front-grip part 3.

Battery packs 12 are respectively mounted on the battery-mounting parts 5.

The battery packs 12 are detachable from the battery-mounting parts 5. The battery packs 12 comprise secondary (rechargeable) batteries. In the present embodiment, the battery packs 12 comprise rechargeable lithium-ion battery cells. By being mounted on the battery-mounting parts 5, the battery packs 12 can supply electric power (current) to the electric work machine 1. The motor 6 operates (is energized or driven) using electric power supplied from the battery packs 12. The controller 11 operates (is energized or powered) using electric power supplied from the battery packs 12.

The motor 6 is the motive power source (prime mover) of the electric work machine 1. The motor 6 generates a rotational force for circulating the saw chain 10 around the guide bar 9. The motor 6 is a brushless electric motor.

The trigger switch 7 is manipulated (pressed) by the user to operate (energize) the motor 6. The trigger switch 7 is provided on the rear-grip part 2C. In response to the trigger switch 7 being manipulated such that it moves upward, the motor 6 operates (is energized). In response to the manipulation of the trigger switch 7 being released, energization of the motor 6 stops.

The trigger-lock lever 8 is disposed on the rear-grip part 2C. In response to the trigger-lock lever 8 being manipulated (pressed), manipulation (pressing) of the trigger switch 7 is permitted.

The guide bar 9 is supported by the housing 2. The guide bar 9 is a plate-shaped member. The saw chain 10 comprises a plurality of cutters (drive links) coupled to each other. The saw chain 10 is disposed on (around) a peripheral-edge portion of the guide bar 9. When the trigger switch 7 is manipulated, the motor 6 operates. The motor 6 and the saw chain 10 are coupled via a power-transmission mechanism (not shown), which comprises a sprocket. In response to the operation (energization) of the motor 6, rotation of the sprocket causes the saw chain 10 to move along the peripheral-edge portion of the guide bar 9.

Electric Motor

Figure 2:
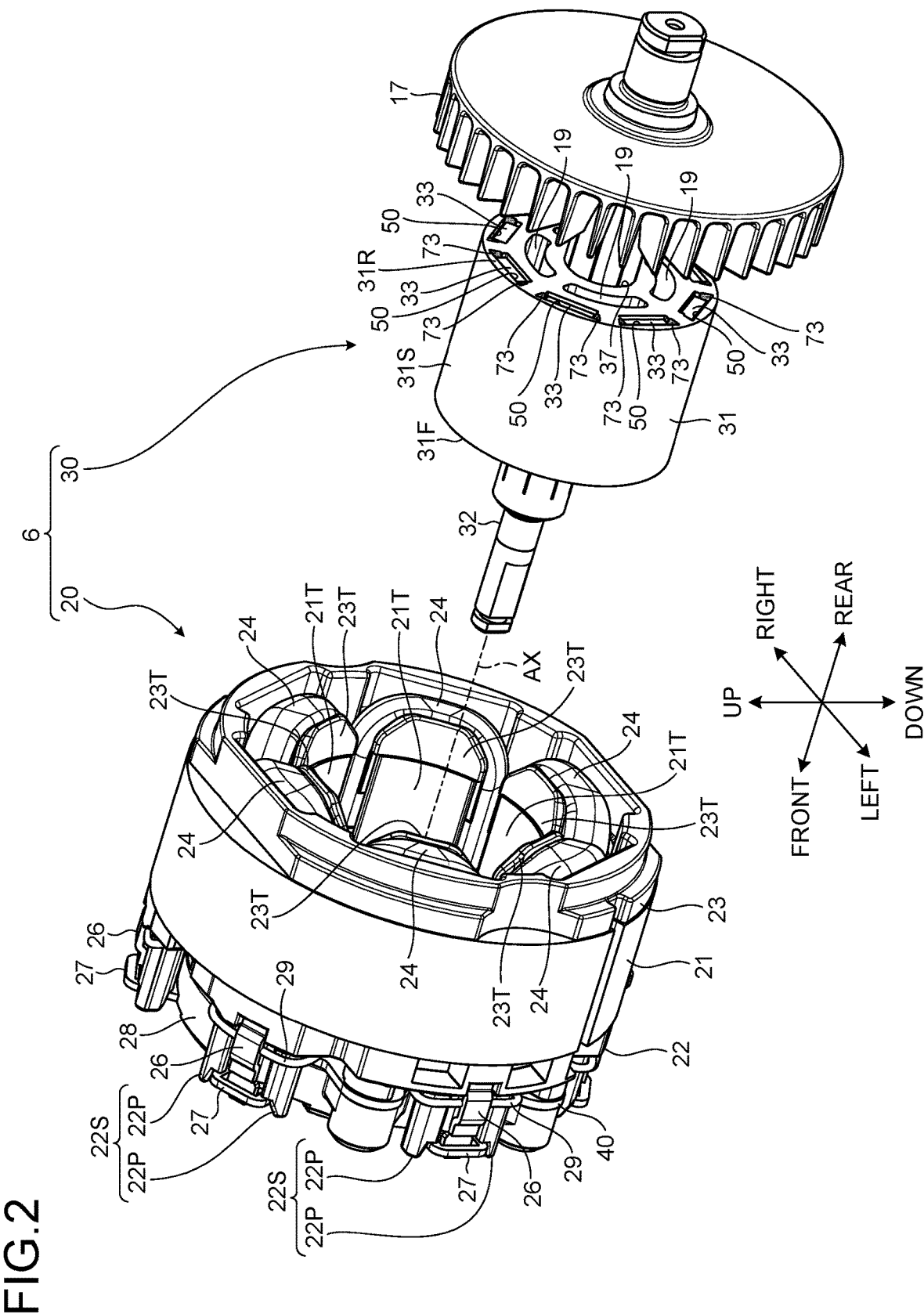
FIG. 2 is an exploded, oblique view, viewed from the rear, that shows a motor according to the first embodiment.
Figure 3:
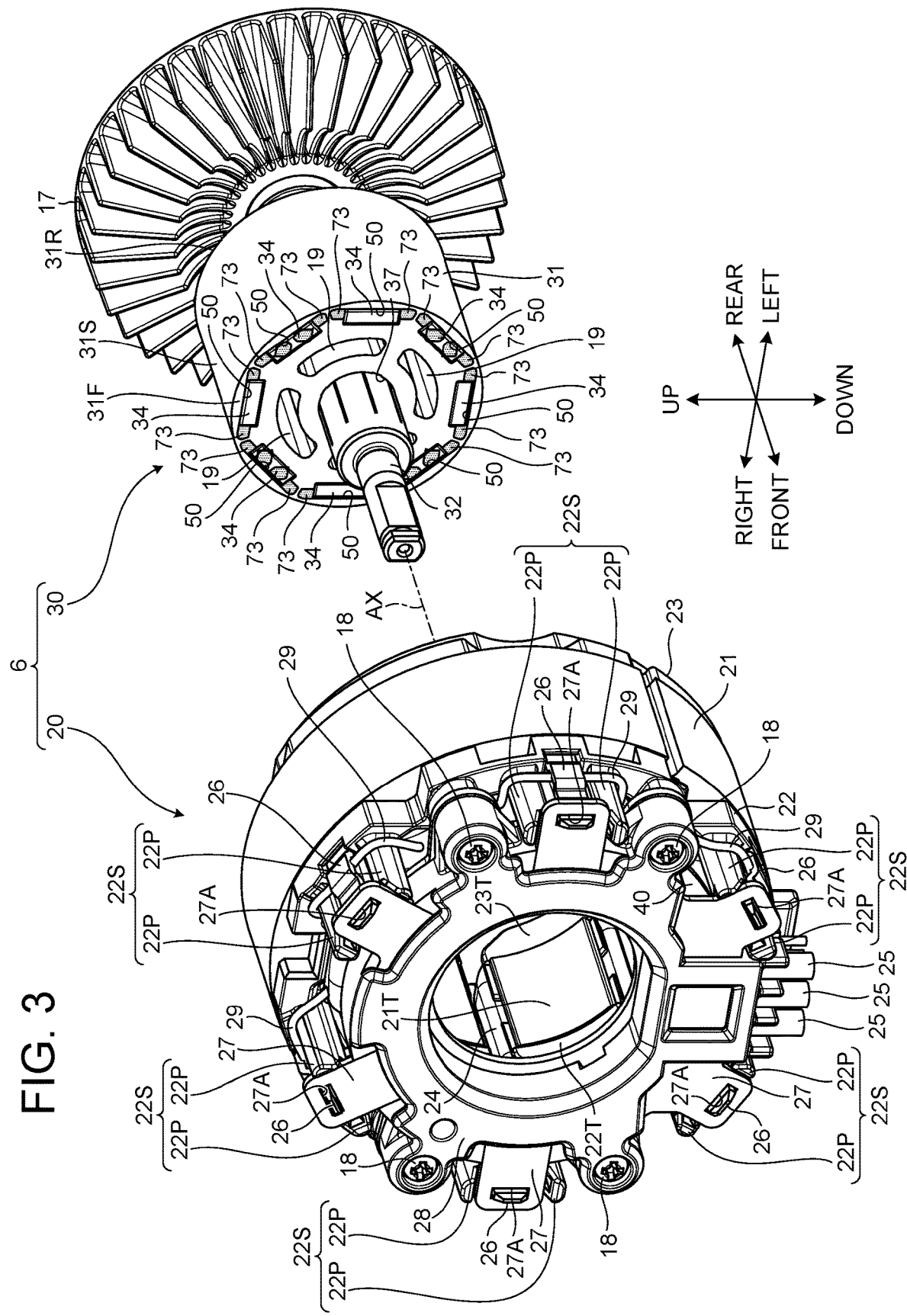
FIG. 3 is an exploded, oblique view, viewed from the front, that shows the motor according to the first embodiment.
Figure 4:
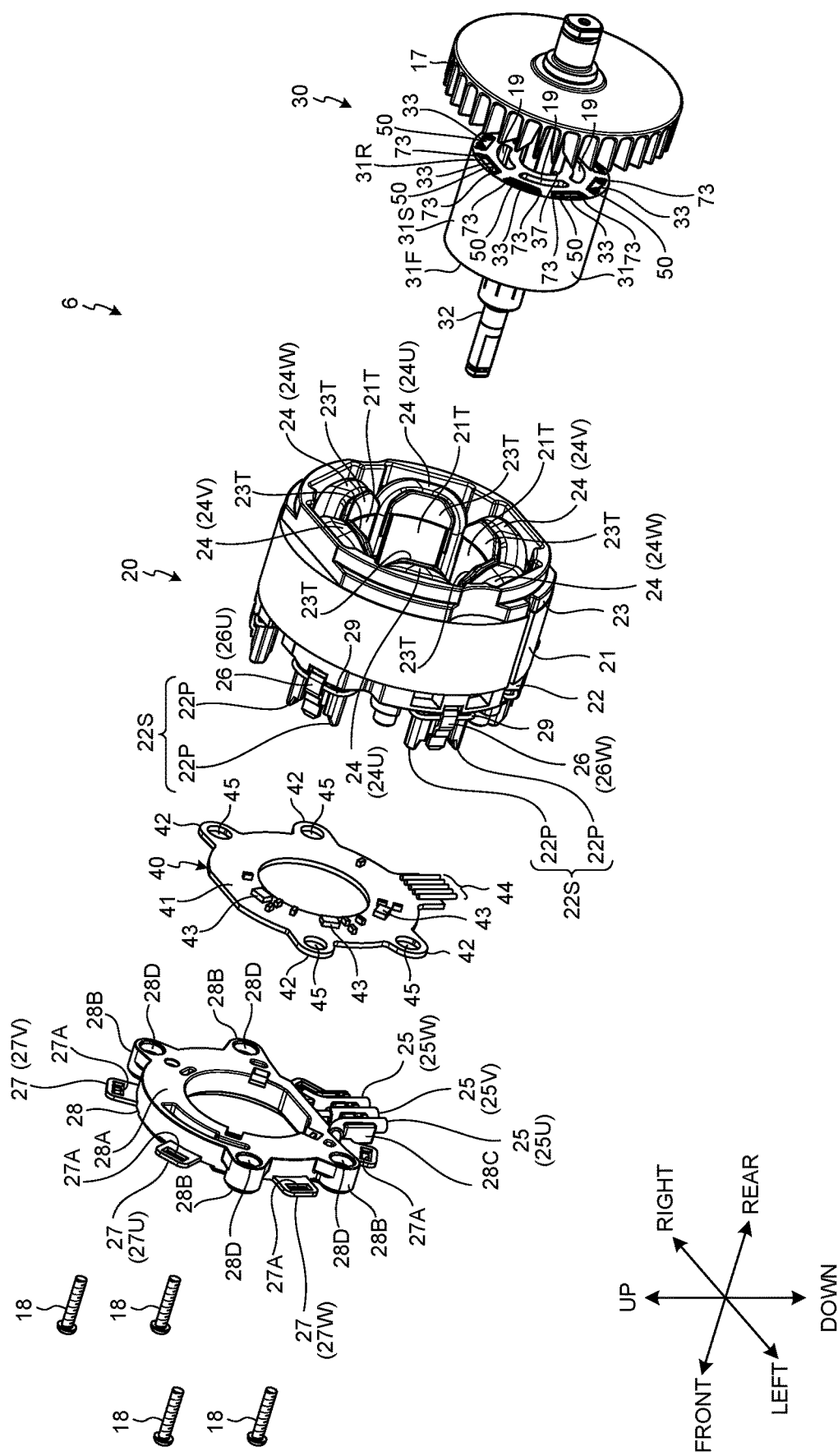
FIG. 4 is an exploded, oblique view, viewed from the rear, that shows a stator and a rotor according to the first embodiment.
Figure 5:
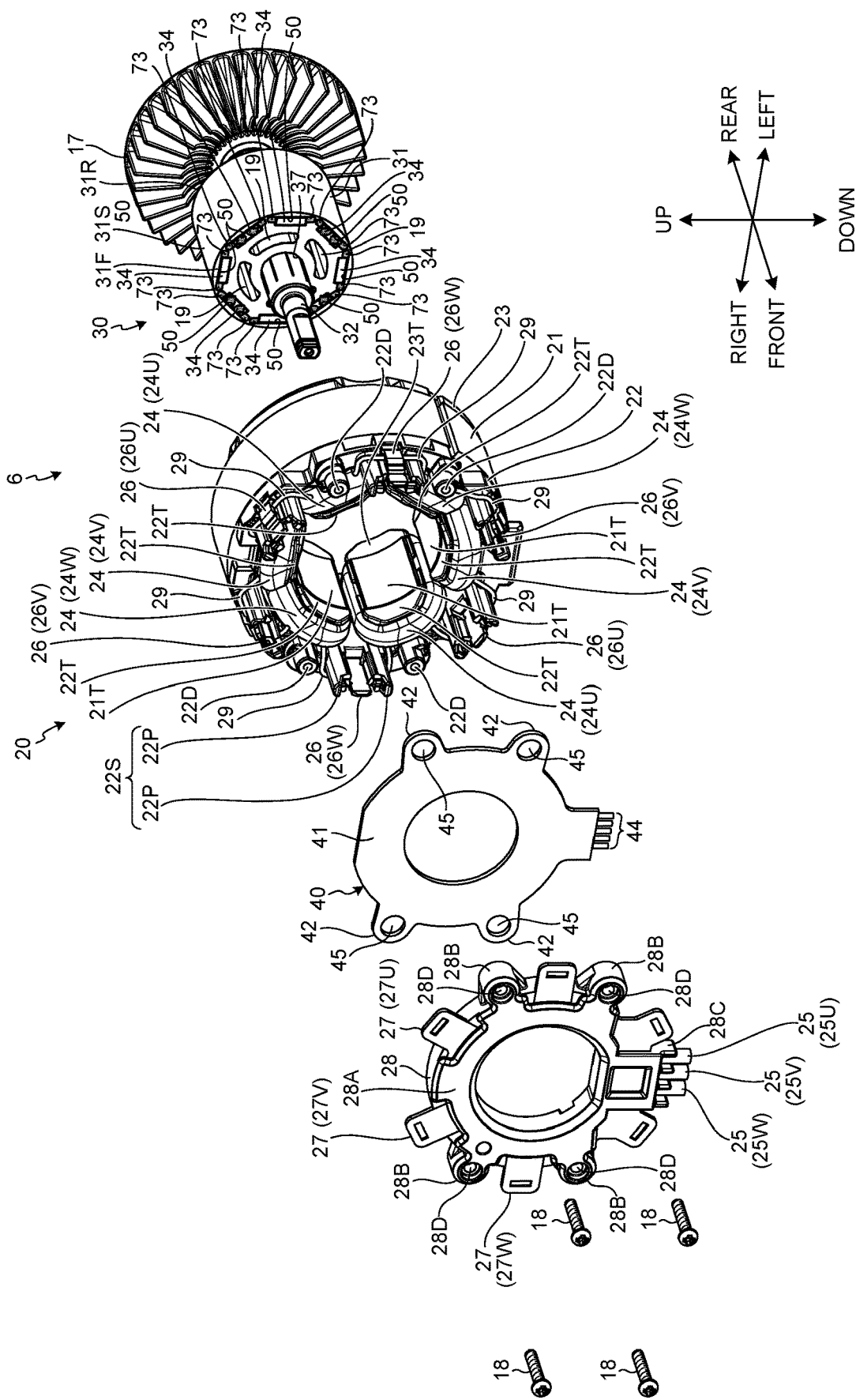
FIG. 5 is an exploded, oblique view, viewed from the front, that shows the stator and the rotor according to the first embodiment.

FIG. 2 is an exploded, oblique view, viewed from the rear, that shows the motor 6 according to the present embodiment. FIG. 3 is an exploded, oblique view, viewed from the front, that shows the motor 6 according to the present embodiment. FIG. 4 is an exploded, oblique view, viewed from the rear, that shows a stator 20 and a rotor 30 according to the present embodiment. FIG. 5 is an exploded, oblique view, viewed from the front, that shows the stator 20 and the rotor 30 according to the present embodiment.

In the present embodiment, the motor 6 is an inner-rotor-type brushless motor. As shown in FIGS. 2-5, the motor 6 comprises the stator 20 and the rotor 30, which rotates relative to the stator 20. The stator 20 is disposed around the rotor 30. The rotor 30 rotates about rotational axis AX.

Stator

The stator 20 comprises a stator core 21, a front insulator 22, a rear insulator 23, coils 24, power-supply lines 25, fusing terminals 26, short-circuiting members 27, and an insulating member 28. The front insulator 22 and the rear insulator 23 may be fixed to the stator core 21 by integral molding (insert molding).

The stator core 21 comprises a plurality of laminated steel sheets. Each of the steel sheets is a sheet made of a metal in which iron is the main component. The stator core 21 has a tube shape. The stator core 21 comprises teeth 21T, which respectively support the coils 24. The teeth 21T protrude radially inward from an inner surface of the stator core 21. In the present embodiment, six of the teeth 21T are provided. The axial length of the stator core 21 may be calculated by multiplying the number of laminated steel sheets by the thickness of one steel sheet in the axial direction.

The front insulator 22 is an electrically insulating member that is made of a synthetic resin (polymer). The front insulator 22 is fixed to a front portion of the stator core 21. The front insulator 22 has a tube shape. The front insulator 22 comprises protruding parts 22T, which respectively support the coils 24. The protruding parts 22T protrude radially inward from an inner surface of the front insulator 22. In the present embodiment, six of the protruding parts 22T are provided.

The rear insulator 23 is an electrically insulating member that is made of a synthetic resin (polymer). The rear insulator 23 is fixed to a rear portion of the stator core 21. The rear insulator 23 has a tube shape. The rear insulator 23 comprises protruding parts 23T, which respectively support the coils 24. The protruding parts 23T protrude radially inward from an inner surface of the rear insulator 23. In the present embodiment, six of the protruding parts 23T are provided.

Front-end portions of the teeth 21T and rear-end portions of the protruding parts 22T are connected. Rear-end portions of the teeth 21T and front-end portions of the protruding parts 23T are connected.

The coils 24 are wound via the front insulator 22 and the rear insulator 23 and around the teeth 21T of the stator core 21. A plurality of the coils 24 is provided. In the present embodiment, six of the coils 24 are provided. The coils 24 are respectively wound on the teeth 21T via the protruding parts 22T and the protruding parts 23T. The coils 24 are disposed around the teeth 21T, the protruding parts 22T, and the protruding parts 23T. The coils 24 and the stator core 21 are insulated from each other by the front insulator 22 and the rear insulator 23.

The plurality of coils 24 is formed by winding a single, continuous (unbroken) wire. The coils 24 that are adjacent to each other in the circumferential direction are each electrically connected by a respective connection wire 29, which is a portion of the single, continuous wire. Thus, each of the connection wires 29 is a wire (wire portion) between one of the coils 24 and another one of the coils 24. The connection wires 29 are supported by (on) the front insulator 22.

The power-supply lines 25 are electrically connected to the battery packs 12 via the controller 11. The battery packs 12 function as the electrical power supply unit of the motor 6. The battery packs 12 supply drive currents to the motor 6 via the controller 11. The controller 11 controls the drive currents supplied from the battery packs 12 to the motor 6. The drive currents from the battery packs 12 are supplied to the power-supply lines 25 via the controller 11.

The fusing terminals 26 are connected to the coils 24 via the connection wires 29. The fusing terminals 26 are electrically conductive members. A plurality of the fusing terminals 26 is disposed around rotational axis AX. The number of the fusing terminals 26 provided is the same as the number of the coils 24. In the present embodiment, six of the fusing terminals 26 are provided.

The fusing terminals 26 are supported by the front insulator 22. In the present embodiment, the front insulator 22 comprises support parts 22S, which respectively support the fusing terminals 26. Six of the support parts 22S are provided such that they are spaced apart in the circumferential direction. Each of the support parts 22S comprises a pair of protruding parts 22P, which protrudes forward from a front surface of the front insulator 22. When each of the fusing terminals 26 is disposed between a pair of the protruding parts 22P, the support parts 22S are supported.

The connection wires 29 are supported by the support parts 22S. The connection wires 29 are supported by outer surfaces of the protruding parts 22P outward in the radial direction. When each of the fusing terminals 26 is disposed between a pair of the protruding parts 22P, the fusing terminals 26 are connected to the connection wires 29. Each of the connection wires 29 is respectively disposed in the interior of a bent portion of the corresponding fusing terminal 26. The fusing terminals 26 and the connection wires 29 are welded together. When the fusing terminals 26 and the connection wires 29 are welded together, the fusing terminals 26 are physically and electrically connected to the connection wires 29.

The short-circuiting members 27 respectively connect the fusing terminals 26 to the power-supply lines 25. The short-circuiting members 27 are electrically conductive members. Within a plane orthogonal to rotational axis AX, the short-circuiting members 27 are curved. A plurality of the short-circuiting members 27 is provided. In the embodiment, three of the short-circuiting members 27 are provided.

Each of the short-circuiting members 27 electrically connects (short circuits) one of the power-supply lines 25 to one pair of the fusing terminals 26. Each of the short-circuiting members 27 has an opening 27A, in which a front portion of the corresponding fusing terminal 26 is disposed. When the front portion of the fusing terminal 26 is disposed in the opening 27A, the fusing terminal 26 and the short-circuiting member 27 are physically and electrically connected.

The insulating member 28 supports the power-supply lines 25 and the short-circuiting members 27. The insulating member 28 is made of a synthetic resin (polymer). The insulating member 28 comprises a body part 28A, screw-boss parts 28B, and a support part 28C.

The body part 28A has a ring shape. In the embodiment, at least a portion of each of the short-circuiting members 27 is disposed in the interior of the body part 28A. Each of the short-circuiting members 27 is fixed to the body part 28A by insert molding. The fusing terminals 26 are supported by the body part 28A via the short-circuiting members 27. The three short-circuiting members 27 are insulated from each other by the body part 28A.

The screw-boss parts 28B protrude radially outward from circumferential-edge portions of the body part 28A. Four of the screw-boss parts 28B are provided at the circumferential-edge portions of the body part 28A.

The support part 28C protrudes downward from a lower portion of the body part 28A. The support part 28C supports the power-supply lines 25.

The power-supply lines 25, the fusing terminals 26, the short-circuiting members 27, and the insulating member 28 are disposed forward of the stator core 21. At least a portion of each of the fusing terminals 26 is disposed rearward of the corresponding short-circuiting member 27 and the insulating member 28.

Figure 6:
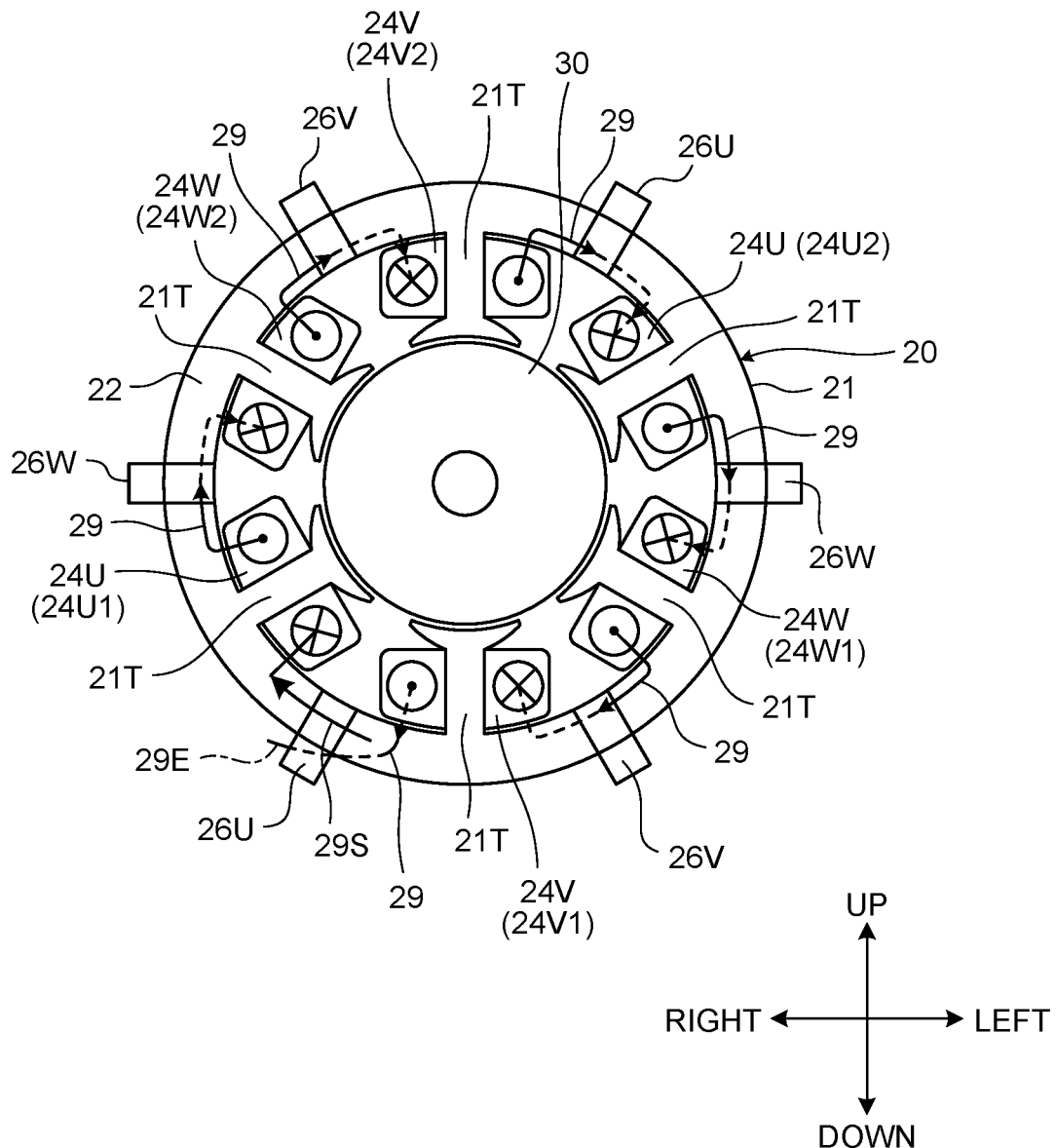
FIG. 6 schematically shows the stator according to the first embodiment.
Figure 7:
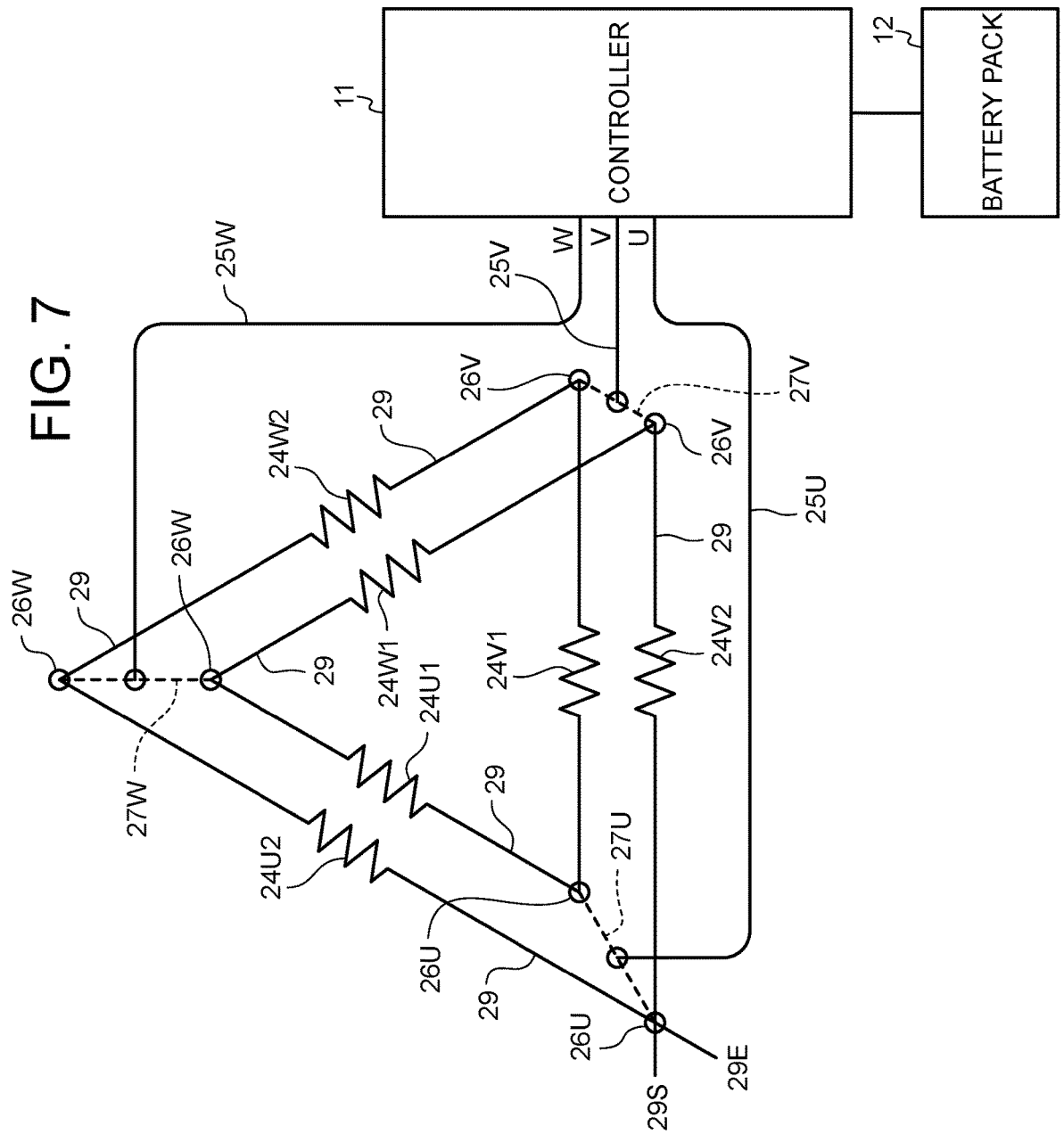
FIG. 7 schematically shows the wiring state of coils according to the first embodiment.

FIG. 6 schematically shows the stator 20 according to the present embodiment. FIG. 7 schematically shows the wiring state of the coils 24 according to the present embodiment.

In the present embodiment, the six coils 24 are formed by winding one single (continuous) wire, as was noted above. As shown in FIGS. 6 and 7, the wire is wound around the teeth 21T starting from a winding-start portion 29S. More specifically, the wire is successively (sequentially) wound around the teeth 21T that are adjacent to each other in the circumferential direction, and thereby the six coils 24 are formed. The winding of the wire ends at a winding-end portion 29E.

As shown in FIG. 7, the battery packs 12 supply drive current to the power-supply lines 25 via the controller 11. The drive current supplied to the power-supply lines 25 is supplied to the fusing terminals 26 via the short-circuiting members 27. The drive current supplied to the fusing terminals 26 is supplied to the coils 24 via the connection wires 29.

In the present embodiment, the drive current includes a U-phase drive current, a V-phase drive current, and a W-phase drive current.

As shown in FIGS. 4-7, the power-supply lines 25 comprise: a U-phase power-supply line 25U, to which the U-phase drive current is supplied; a V-phase power-supply line 25V, to which the V-phase drive current is supplied; and a W-phase power-supply line 25W, to which the W-phase drive current is supplied.

The short-circuiting members 27 comprise: a U-phase short-circuiting member 27U connected to the U-phase power-supply line 25U; a V-phase short-circuiting member 27V connected to the V-phase power-supply line 25V; and a W-phase short-circuiting member 27W connected to the W-phase power-supply line 25W.

The fusing terminals 26 comprise: a pair of U-phase fusing terminals 26U connected to the U-phase short-circuiting member 27U; a pair of V-phase fusing terminals 26V connected to the V-phase short-circuiting member 27V; and a pair of W-phase fusing terminals 26W connected to the W-phase short-circuiting member 27W.

Each of the six coils 24 is allocated to one of the phases, namely: the U (U-V) phase, the V (V-W) phase, or the W (W-U) phase.

Each of the three pairs of coils 24 is allocated to one of the U phase, the V phase, or the W phase. The six coils 24 comprise: a pair of U-phase coils 24U allocated to the U phase; a pair of V-phase coils 24V allocated to the V phase; and a pair of W-phase coils 24W allocated to the W phase.

The pair of U-phase coils 24U is disposed such that the U-phase coils 24U oppose each other in the radial direction. The pair of V-phase coils 24V is disposed such that the V-phase coils 24V oppose each other in the radial direction. The pair of W-phase coils 24W is disposed such that the W-phase coils 24W oppose each other in the radial direction. As shown in FIG. 6, in the circumferential direction, a V-phase coil 24V1 is disposed adjacent to a U-phase coil 24U1, a W-phase coil 24W1 is disposed adjacent to the V-phase coil 24V1, a U-phase coil 24U2 is disposed adjacent to the W-phase coil 24W1, a V-phase coil 24V2 is disposed adjacent to the U-phase coil 24U2, and a W-phase coil 24W2 is disposed adjacent to the V-phase coil 24V2. The U-phase coil 24U1 and the U-phase coil 24U2 are disposed such that they oppose each other in the radial direction. The V-phase coil 24V1 and the V-phase coil 24V2 are disposed such that they oppose each other in the radial direction. The W-phase coil 24W1 and the W-phase coil 24W2 are disposed such that they oppose each other in the radial direction.

As shown in FIG. 6, one of the U-phase fusing terminals 26U is connected to the connection wire 29 that connects the U-phase coil 24U1 and the V-phase coil 24V1, which are adjacent to each other in the circumferential direction. The other U-phase fusing terminal 26U is connected to the connection wire 29 that connects the U-phase coil 24U2 and the V-phase coil 24V2, which are adjacent to each other in the circumferential direction. One of the V-phase fusing terminals 26V is connected to the connection wire 29 that connects the V-phase coil 24V1 and the W-phase coil 24W1, which are adjacent to each other in the circumferential direction. The other V-phase fusing terminal 26V is connected to the connection wire 29 that connects the V-phase coil 24V2 and the W-phase coil 24W2, which are adjacent to each other in the circumferential direction. One of the W-phase fusing terminals 26W is connected to the connection wire 29 that connects the W-phase coil 24W1 and the U-phase coil 24U2, which are adjacent to each other in the circumferential direction. The other W-phase fusing terminal 26W is connected to the connection wire 29 that connects the W-phase coil 24W2 and the U-phase coil 24U1, which are adjacent to each other in the circumferential direction.

The U-phase short-circuiting member 27U electrically connects (short circuits) the U-phase power-supply line 25U to the U-phase fusing terminals 26U of the pair of U-phase fusing terminals 26U. More specifically, the U-phase power-supply line 25U is electrically connected to (e.g., an intermediate portion of) the U-phase short-circuiting member 27U. One of the U-phase fusing terminals 26U is disposed at and electrically connected to one-end portion of the U-phase short-circuiting member 27U. The other U-phase fusing terminal 26U is disposed at and electrically connected to the other-end portion of the U-phase short-circuiting member 27U.

The V-phase short-circuiting member 27V electrically connects (short circuits) the V-phase power-supply line 25V to the pair of V-phase fusing terminals 26V. More specifically, the V-phase power-supply line 25V is electrically connected to (e.g., an intermediate portion of) of the V-phase short-circuiting member 27V. One of the V-phase fusing terminals 26V is disposed at and electrically connected to one-end portion of the V-phase short-circuiting member 27V. The other V-phase fusing terminal 26V is electrically connected to the other-end portion of the V-phase short-circuiting member 27V.

The W-phase short-circuiting member 27W electrically connects (short circuits) the W-phase power-supply line 25W to the pair of W-phase fusing terminals 26W. More specifically, the W-phase power-supply line 25W is electrically connected to (e.g., an intermediate portion of) of the W-phase short-circuiting member 27W. One of the W-phase fusing terminals 26W is disposed at and electrically connected to one-end portion of the W-phase short-circuiting member 27W. The other W-phase fusing terminal 26W is electrically connected to the other-end portion of the W-phase short-circuiting member 27W.

As shown in FIG. 7, the U-phase coil 24U1, the V-phase coil 24V1, and the W-phase coil 24W1, which constitute one group, are delta connected. The U-phase coil 24U2, the V-phase coil 24V2, and the W-phase coil 24W2, which constitute one (another) group, are delta connected. The one delta connection and the other delta connection are disposed in parallel. In the embodiment, the six coils 24 are delta connected in a 1S2P configuration.

When the U-phase drive current is input to the U-phase power-supply line 25U, the U-phase drive current is supplied to the pair of U-phase fusing terminals 26U via the U-phase short-circuiting member 27U. When the U-phase coil 24U1, which is one of the U-phase coils 24U among the pair of U-phase coils 24U, is excited to the N pole, the U-phase coil 24U2, which is the other U-phase coil 24U from among the pair of U-phase coils 24U, is excited to the S pole. The V-phase coil 24V1, which is adjacent to the U-phase coil 24U1 excited to the N pole, is excited to the S pole, and the V-phase coil 24V2, which is adjacent to the U-phase coil 24U2 excited to the S pole, is excited to the N pole.

When the V-phase drive current is input to the V-phase power-supply line 25V, the V-phase drive current is supplied to the pair of V-phase fusing terminals 26V via the V-phase short-circuiting member 27V. When the V-phase coil 24V1, which is one of the V-phase coils 24V among the pair of V-phase coils 24V, is excited to the N pole, the V-phase coil 24V2, which is the other V-phase coil 24V from among the pair of V-phase coils 24V, is excited to the S pole. The W-phase coil 24W1, which is adjacent to the V-phase coil 24V1 excited to the N pole, is excited to the S pole, and the W-phase coil 24W2, which is adjacent to the V-phase coil 24V2 excited to the S pole, is excited to the N pole.

When the W-phase drive current is input to the W-phase power-supply line 25W, the W-phase drive current is supplied to the pair of W-phase fusing terminals 26W via the W-phase short-circuiting member 27W. When the W-phase coil 24W1, which is one of the W-phase coils 24W from among the pair of W-phase coils 24W, is excited to the N pole, the W-phase coil 24W2, which is the other W-phase coil 24W from among the pair of W-phase coils 24W, is excited to the S pole. The U-phase coil 24U1, which is adjacent to the W-phase coil 24W1 excited to the N pole, is excited to the S pole, and the U-phase coil 24U2, which is adjacent to the W-phase coil 24W2 excited to the S pole, is excited to the N pole.

Sensor Board

Referring back to FIGS. 4 and 5, the electric work machine 1 comprises a sensor board 40, which comprises magnetic sensors 43 that detect the rotation of the rotor 30. A Hall-effect sensor is an illustrative example of the magnetic sensors 43. The sensor board 40 is disposed forward of the front insulator 22. The sensor board 40 is disposed such that it opposes (faces) the front insulator 22. The sensor board 40 comprises a plate part 41, screw-boss parts 42, the magnetic sensors 43, and signal lines 44.

The plate part 41 has a ring shape. The screw-boss parts 42 protrude outward in the radial direction from circumferential-edge portions of the plate part 41. Four of the screw-boss parts 42 are provided at the circumferential-edge portions of the plate part 41.

The magnetic sensors 43 detect the rotation of the rotor 30. The magnetic sensors 43 are supported by the plate part 41. The magnetic sensors 43 comprise Hall-effect devices. Three of the magnetic sensors 43 are provided.

Detection signals of the magnetic sensors 43 are output to the controller 11 via the signal lines 44. The controller 11 supplies drive current to the plurality of coils 24 based on the detection signals of the magnetic sensors 43.

Fixing of Insulating Member, Sensor Board, and Front Insulator

The insulating member 28—which supports the short-circuiting members 27—the sensor board 40, and the front insulator 22 are fixed by four screws 18. The insulating member 28, the sensor board 40, and the front insulator 22 are fixed by the screws 18 such that the location of the signal lines 44 and the location of at least a portion of the power-supply lines 25 in the circumferential direction coincide.

Openings 28D, in which intermediate portions of the screws 18 are disposed, are provided in the screw-boss parts 28B of the insulating member 28. Openings 45, in which intermediate portions of the screws 18 are disposed, are provided in the screw-boss parts 42 of the sensor board 40. Four screw holes 22D are provided in a front surface of the front insulator 22. In the state in which the intermediate portions of the screws 18 are disposed in the openings 28D and the openings 45, tip portions of the screws 18 are coupled into the screw holes 22D. Thereby, the insulating member 28, the sensor board 40, and the front insulator 22 are fixed by the screws 18.

Rotor

Figure 8:
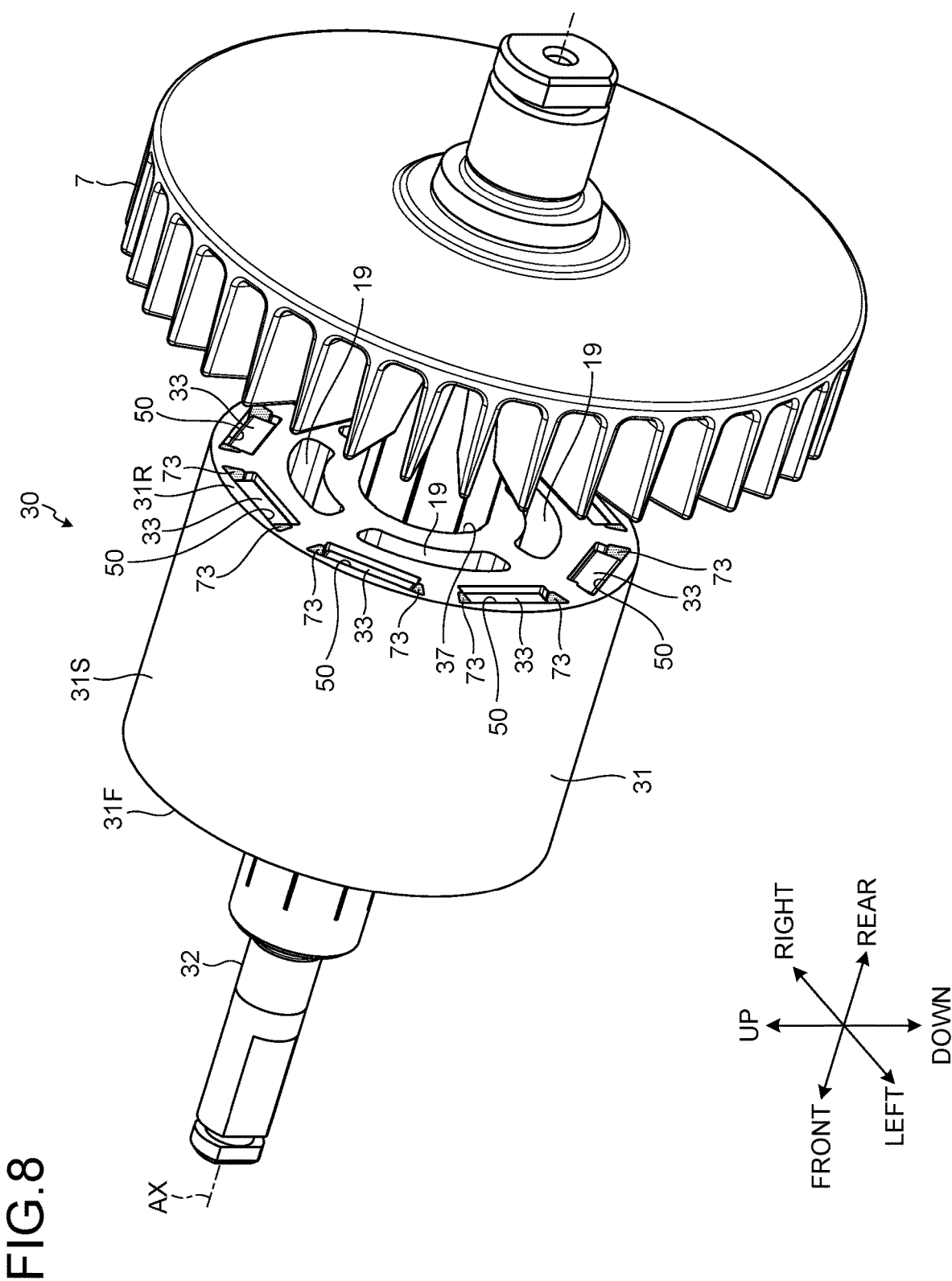
FIG. 8 is an oblique view, viewed from the rear, that shows the rotor according to the first embodiment.
Figure 9:
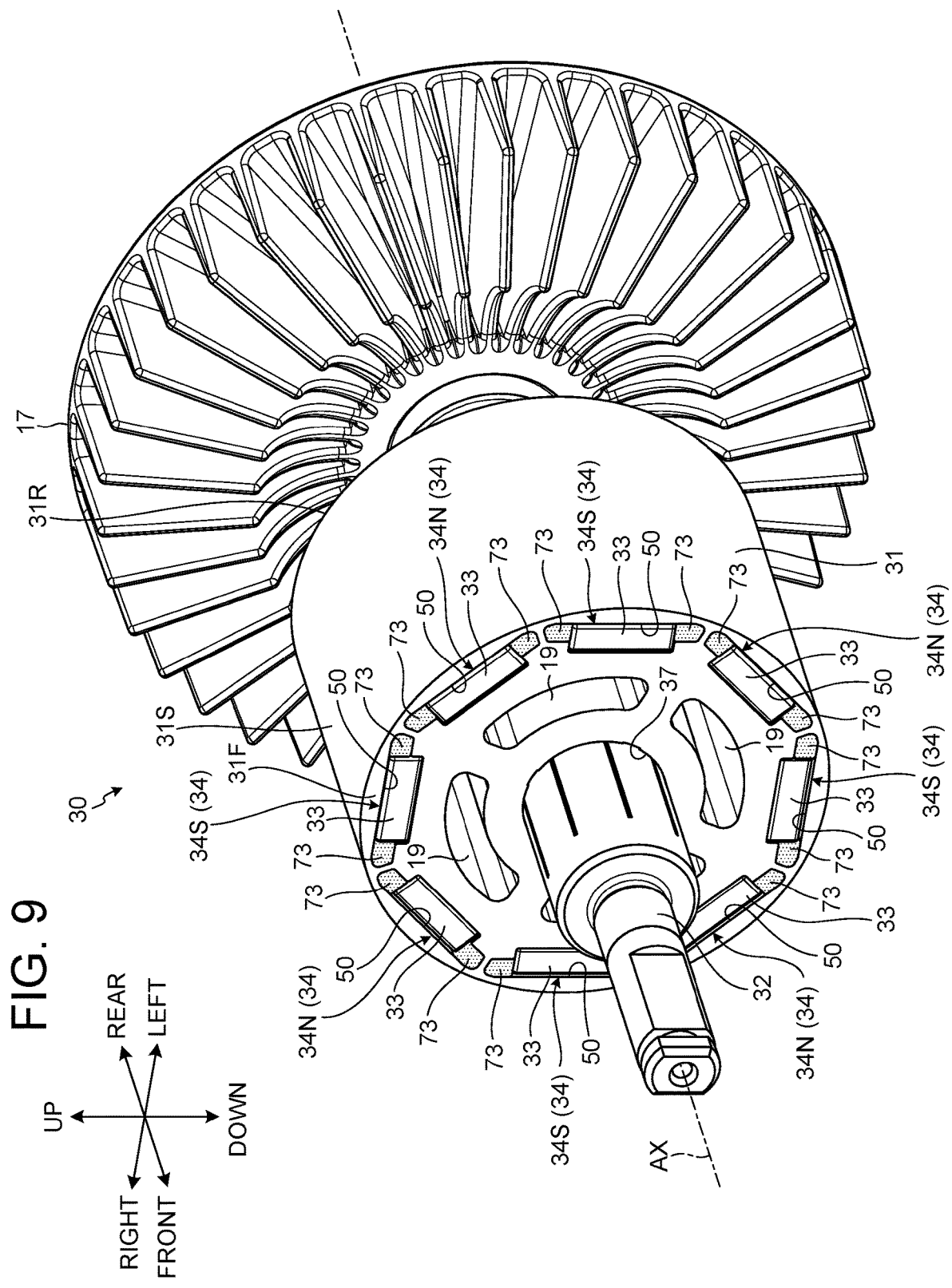
FIG. 9 is an oblique view, viewed from the front, that shows the rotor according to the first embodiment.

FIG. 8 is an oblique view, viewed from the rear, that shows the rotor 30 according to the present embodiment. FIG. 9 is an oblique view, viewed from the front, that shows the rotor 30 according to the present embodiment.

As shown in FIGS. 8 and 9, the rotor 30 comprises a rotor core 31, a rotor shaft 32, and magnet-pole parts 34. The rotor 30 rotates about rotational axis AX.

Figure 10:
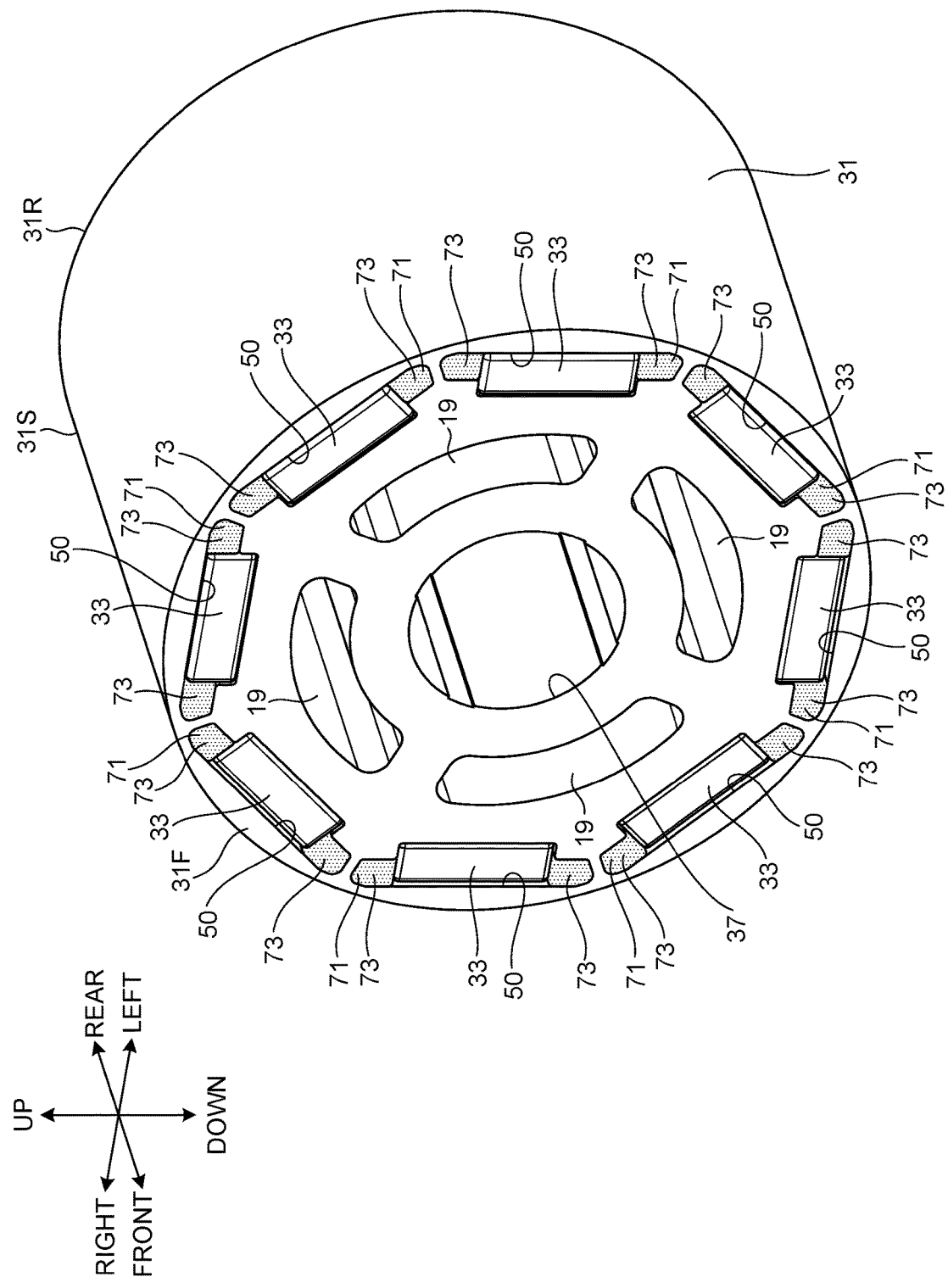
FIG. 10 is an oblique view, viewed from the front, that shows a rotor core according to the first embodiment.

FIG. 10 is an oblique view, viewed from the front, that shows the rotor core 31 according to the present embodiment. The rotor core 31 comprises a plurality of laminated steel sheets. Each of the steel sheets is a sheet that is made of a metal in which iron is the main component. The rotor core 31 is disposed such that it surrounds rotational axis AX. The axial length of the rotor core 31 may be calculated by multiplying the number of laminated steel sheets by the thickness of one steel sheet in the axial direction.

The rotor core 31 is substantially circular-tube shaped. A shaft opening (through hole) 37 is formed at (in) a center portion of the rotor core 31. The shaft opening 37 is formed such that it goes through the front surface and the rear surface of the rotor core 31. The rotor core 31 comprises a front-end portion (side) 31F and a rear-end portion (side) 31R.

The rotor shaft 32 extends in the axial direction. The rotor shaft 32 is disposed in the interior of the rotor core 31. The rotor shaft 32 is disposed in the shaft opening 37 of the rotor core 31. The rotor core 31 and the rotor shaft 32 are fixed. A front portion of the rotor shaft 32 protrudes forward from the front-end portion 31F of the rotor core 31. A rear portion of the rotor shaft 32 protrudes rearward from the rear-end portion 31R of the rotor core 31. The front portion of the rotor shaft 32 is supported in a rotatable manner by a front bearing, which is not shown. The rear portion of the rotor shaft 32 is supported in a rotatable manner by a rear bearing, which is not shown.

The saw chain 10 described above is the output part of the electric work machine 1, which is directly driven by the rotor 30. The sprocket described above is directly fixed to the rotor shaft 32. That is, in the present embodiment, the motor 6 drives the saw chain 10 using a so-called direct-drive system. A speed-reducing mechanism is not disposed (operably coupled) between the motor 6 and the sprocket. It is noted that a speed-reducing mechanism optionally may be disposed (operably coupled) between the motor 6 and the sprocket. That is, the saw chain 10, which is the output part of the electric work machine 1, may be indirectly driven by the rotor 30. The saw chain 10 can be driven with higher torque by interposing (operably coupling) a speed-reducing mechanism between the rotor 30 and the sprocket.

A plurality of the magnetic-pole parts 34 is disposed in (around) the circumferential direction of the rotor core 31. The circumferential direction of the rotor core 31 is the circumferential direction of rotational axis AX. Each of the magnetic-pole parts 34 is constituted by at least one permanent magnet 33, which is fixed to (in) the rotor core 31. In the present embodiment, eight of the magnetic-pole parts 34 are disposed spaced apart around rotational axis AX. The magnetic-pole parts 34 each extend in directions that are parallel to the axial direction or rotational axis AX of the rotor core 31. More specifically, the magnetic-pole parts 34 are disposed equispaced in (around) the circumferential direction of the rotor core 31 along a virtual circumscribed circle defined (existing) in a plane perpendicular to rotational axis AX of the rotor core 31.

The magnetic-pole parts 34 comprise first magnetic-pole parts 34N and second magnetic-pole parts 34S, the magnetic poles of which differ from each other. The first magnetic-pole parts 34N and the second magnetic-pole parts 34S are disposed alternately in (around) the circumferential direction of the rotor core 31. Four of the first magnetic-pole parts 34N are disposed spaced apart around rotational axis AX. Four of the second magnetic-pole parts 34S are disposed spaced apart around rotational axis AX. The permanent magnets 33 that constitute the first magnetic-pole parts 34N are each fixed to (in) the rotor core 31 such that its N pole is oriented (faces) radially outward and its S pole is oriented (faces) radially inward. The permanent magnets 33 that constitute the second magnetic-pole parts 34S are each fixed to (in) the rotor core 31 such that its S pole is oriented (faces) radially outward and its N pole is oriented (faces) radially inward.

In the present (first) embodiment, the permanent magnets 33 are disposed in the interior of the rotor core 31. Thus, the motor 6 is an interior permanent magnet (IPM) motor.

Each of the permanent magnets 33 is a neodymium-iron-boron sintered magnet (NdFeB sintered magnet). The residual magnetic-flux density of each of the permanent magnets 33 is 1.0 T or more and 1.5 T or less.

The sensor board 40 is disposed forward of the rotor core 31. The plate part 41 of the sensor board 40 is disposed around a front portion of the rotor shaft 32. The magnetic sensors 43 are supported by the plate part 41. The magnetic sensors 43 are disposed at locations at which they oppose (face) the front-end portion 31F of the rotor core 31. By disposing the magnetic sensors 43 at locations at which they oppose the front-end portion 31F of the rotor core 31, the magnetic sensors 43 detect the rotation of the rotor 30. By detecting the magnetic fluxes of the permanent magnets 33, the magnetic sensors 43 detect the position of the rotor 30 in the rotational direction.

A fan 17 is fixed to a rear portion of the rotor shaft 32. The fan 17 is disposed rearward of the rotor core 31. At least a portion of the fan 17 is disposed at a location at which it opposes the rear-end portion 31R of the rotor core 31. When the rotor shaft 32 rotates, the fan 17 rotates together with the rotor shaft 32.

The rotor core 31 comprises a plurality of magnet holes 50 provided spaced apart in (around) the circumferential direction. The permanent magnets 33 are respectively disposed in the magnet holes 50. The number of the magnet holes 50 is eight, i.e. the same number as the pole count (i.e. the total number of magnetic-pole parts 34). The magnet holes 50 are provided equispaced in (around) the circumferential direction. Within a plane orthogonal to rotational axis AX, the shapes of the magnet holes 50 are the same. Within a plane orthogonal to rotational axis AX, the dimensions of the magnet holes 50 are the same.

A gap 71 (see also FIG. 30) is formed between the surface of each of the permanent magnets 33, which is disposed in its corresponding magnet hole 50, and at least a portion of the inner surface of that magnet hole 50. A resin 73, such as an adhesive or bonding agent, is disposed in the gaps 71.

In the present first embodiment, through holes 19 are formed in the rotor core 31. Each of the through holes 19 is formed such that it goes through the front surface and the rear surface of the rotor core 31. In the radial direction, the through holes 19 are formed between the shaft opening 37 of the rotor core 31 and an outer surface 31S of the rotor core 31. Four of the through holes 19 are formed around rotational axis AX. Within a plane orthogonal to rotational axis AX, each of the through holes 19 has an arcuate shape. The weight of the rotor core 31 is reduced by the through holes 19, and cooling performance is improved. Further description concerning the through holes 19 (and alternately, blind holes 119) is provided below with reference to FIGS. 31-33.

Pole Count and Slot Count

In the present embodiment, the pole count, which indicates (is defined as) the total number of the magnetic-pole parts 34, is greater than the slot count, which indicates (is defined as) the total number of the coils 24. In addition, the pole count is preferably six or more. As described above, in the first embodiment, the motor 6 comprises eight of the magnetic-pole parts 34 and six of the coils 24. That is, in the first embodiment, the pole count is eight and the slot count is six. In addition, the pole-pairs count, which indicates the number of the first magnetic-pole parts 34N as well as of the second magnetic-pole parts 34S, is four, because there are four pairs of first magnetic-pole parts 34N and the second magnetic-pole parts 34S.

Induced Voltage Constant

First induced voltage constant Ea [V/krpm] and second induced voltage constant Eb [V/krpm·pole-pairs count], which provide an indication of the performance of the motor 6, are defined as follows. When the induced voltage of the motor 6 is given as Va [Volts] and the rotational speed of the motor 6 is given as w [krpm, i.e. kilorevolutions per minute], first induced voltage constant Ea is expressed by (calculated according to) Equation (1) below.

$$Ea = Va/\omega \quad (1)$$

When the power-supply voltage of the motor 6 is given as Vb [Volts] and the pole-pairs count, which indicates (is defined as) the number of the first magnetic-pole parts 34N or the second magnetic-pole parts 34S, is given as Pi, second induced voltage constant Eb is expressed by (calculated according to) Equation (2) below. In the present first embodiment, the power-supply voltage of the motor 6 is the rated voltage of the battery packs 12.

$$Eb = Ea/Pi \quad (2)$$

It is noted that induced voltage Va refers to a voltage that, in response to an increase or decrease in magnetic fluxes associated with the coils 24, is generated in a direction that inhibits that increase or decrease in those magnetic fluxes. As the rotor 30 rotates, induced voltages are generated between the terminals of each of the U terminal, the V terminal, and the W terminal of the motor 6.

In the embodiment, the motor 6 satisfies the condition of Equation (3) below.

$$Eb \leq 0.025 \times Vb \quad (3)$$

Figure 11:
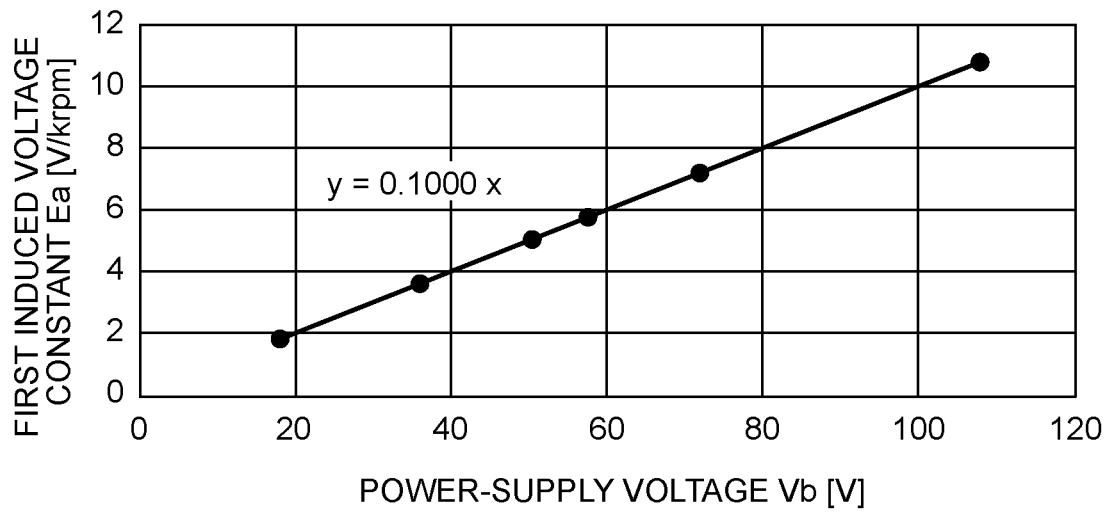
FIG. 11 is a graph that shows the relationship between power-supply voltage and first induced voltage constant according to the first embodiment.

FIG. 11 is a graph that shows the relationship between power-supply voltage Vb and first induced voltage constant Ea according to the present embodiment. FIG. 11 shows the relationship between first induced voltage constant Ea and power-supply voltage Vb in the situation in which the desired induced voltage Va is generated in the motor 6 having a pole count of eight and when rotational speed w is 10,000 rpm, i.e. 10 krpm.

Figure 12:
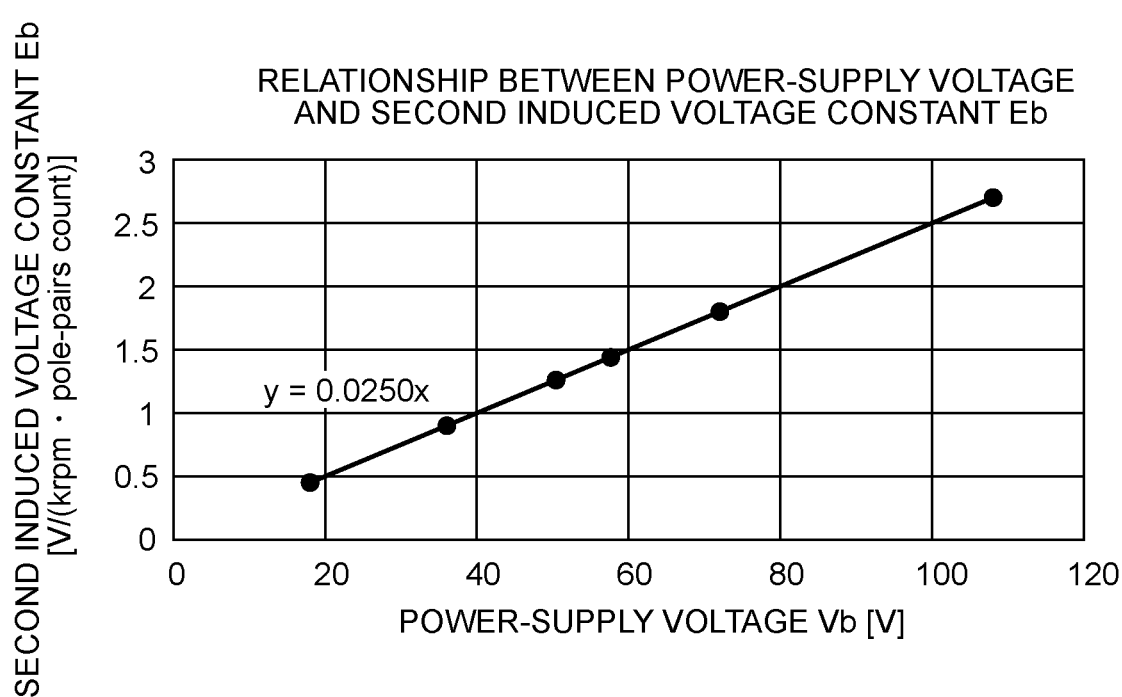
FIG. 12 is a graph that shows the relationship between power-supply voltage and second induced voltage constant according to the first embodiment.

FIG. 12 is a graph that shows the relationship between power-supply voltage Vb and second induced voltage constant Eb according to the present first embodiment. In the first embodiment, because the pole-pairs count is four, FIG. 12 shows the relationship between second induced voltage constant Eb and power-supply voltage Vb in the situation in which the desired induced voltage Va is generated in the motor 6 having a pole count of eight and when rotational speed w is 40,000 rpm, i.e. 40 krpm.

Equation (3) indicates a condition of the motor 6 that is suitable for use in the electric work machine 1. As shown in FIGS. 11 and 12, a motor 6 that satisfies the condition of Equation (3) means that it is a brushless motor in which the pole count is eight, and the rotational speed is 10,000 rpm or more.

Induced Voltage

Figure 13:
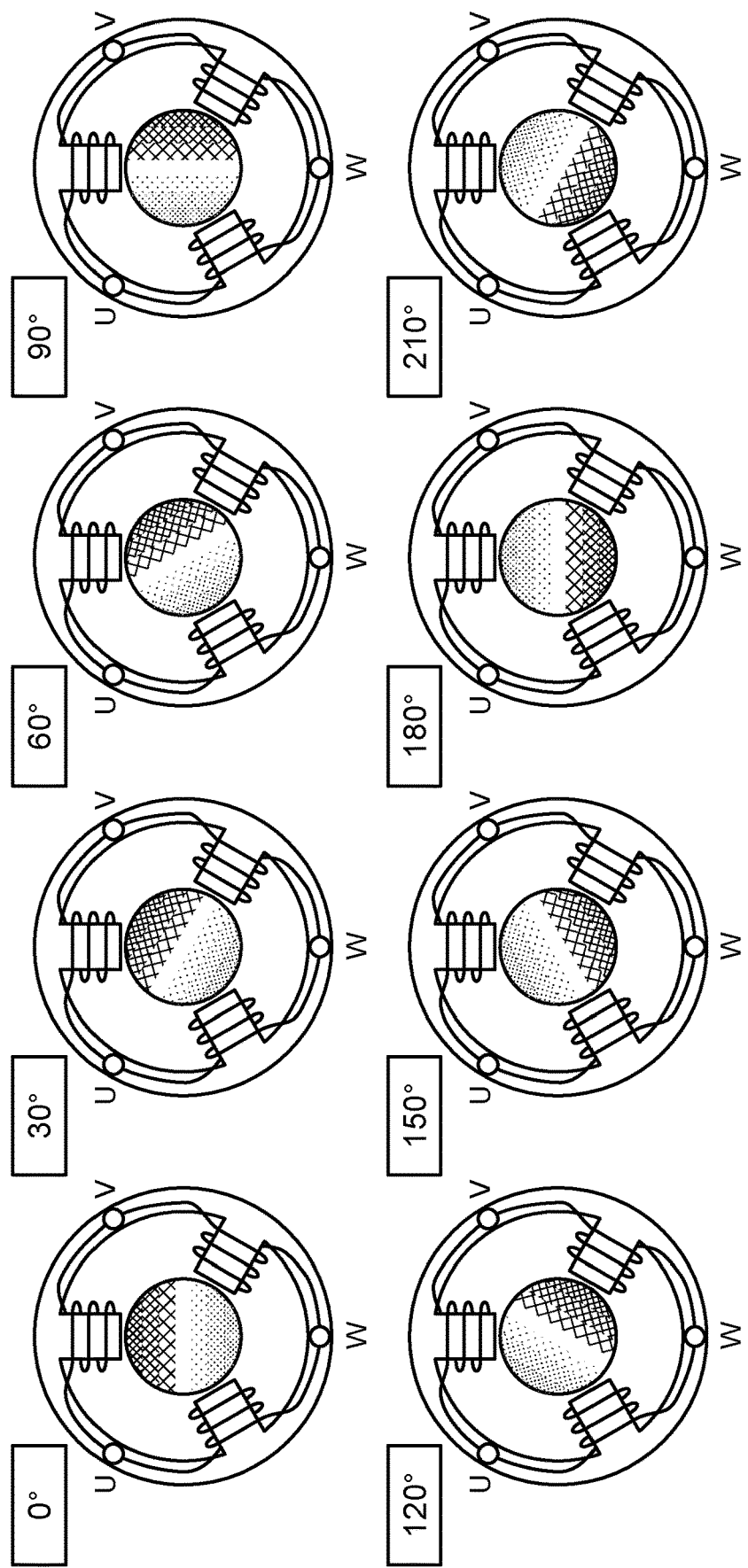
FIG. 13 includes drawings for explaining the induced voltage.
Figure 14:
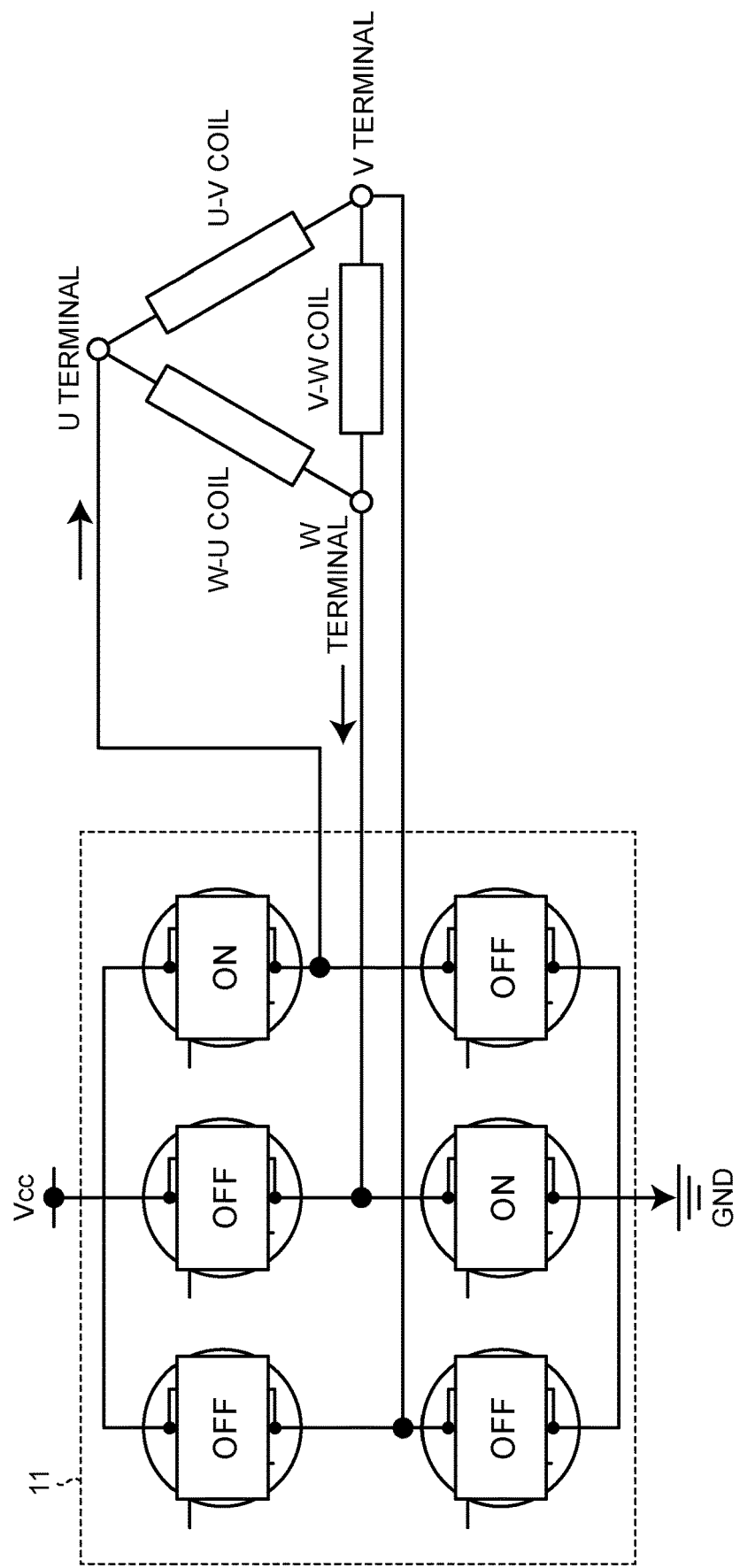
FIG. 14 shows the wiring structure of the coils.
Figure 15:
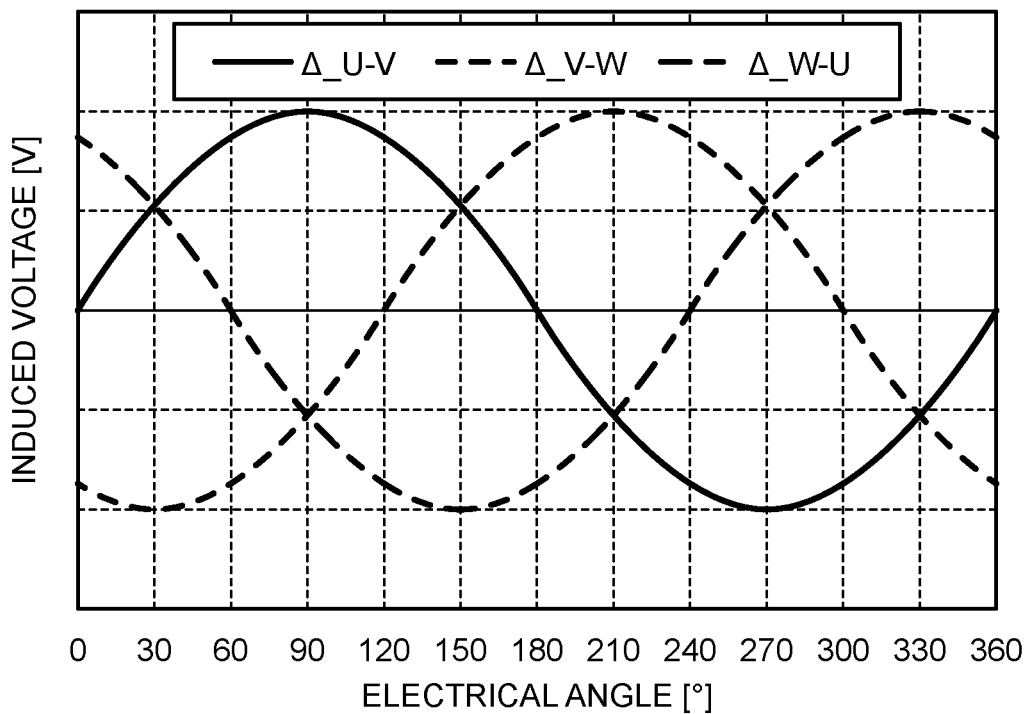
FIG. 15 is a graph that shows the relationship between electrical angle and induced voltage.

Induced voltage will now be explained. FIG. 13 includes drawings for explaining induced voltage. For the sake of simplicity, FIG. 13 shows the relationship between the position of the rotor, which has a 2-pole/3-slot configuration and is delta connected, in the rotational direction and the induced voltage. FIG. 14 shows the wiring structure of the coils. The three coils shown in FIG. 13 are delta connected as shown in FIG. 14. FIG. 15 is a graph that shows the relationship between electrical angle and induced voltage.

Induced voltage refers to a voltage that, in response to an increase in magnetic flux associated with a coil, is generated in a direction that inhibits that increase in magnetic flux. In other words, induced voltage is the electromotive force (voltage) that opposes a change in current that induced it. With regard to the motor, induced voltages are generated between the U, V, and W terminals in accordance with (in proportion to) the rotational speed of the motor.

The angles shown in FIG. 13 indicate rotational angles (mechanical angles) of the rotor. Because the motor in the example shown in FIG. 13 has two poles, the rotational angle (mechanical angle) of the rotor is equal to the electrical angle. The electrical angle refers to the angle defined as 360° when the N pole and the S pole have rotated for one period. For example, in the case of a 2-pole motor and a mechanical angle of 1°, the electrical angle is also 1°. In the case of a four-pole motor and a mechanical angle of 1°, the electrical angle is 2°. As shown in FIG. 14, when the rotor is caused to rotate, the controller 11 switches the plurality of FETs using a plurality of switching patterns (current waveforms) based on the detection results of the magnetic sensors 43. Drive voltages corresponding to the position of the rotor are impressed, and thereby electric currents flow to the coils, and by using the attraction and the repulsion of the teeth and the rotor, in which the teeth around which the coils are wound serve as electromagnets, the rotor is caused to rotate. Induced voltage E is generated between the terminals as shown in FIG. 15.

Figure 16:
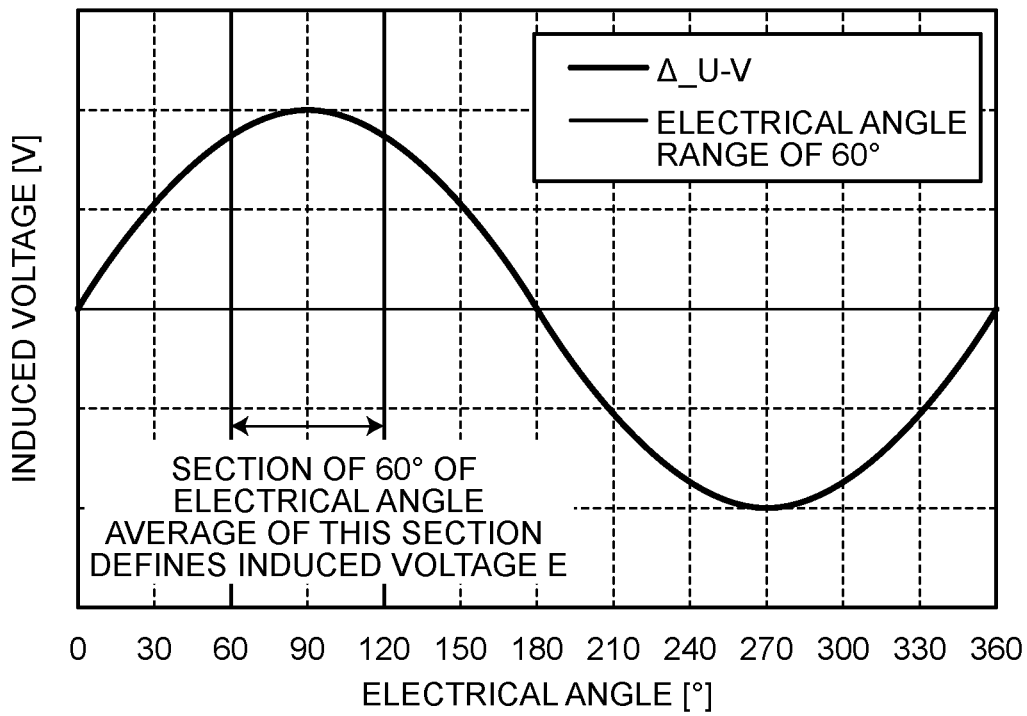
FIG. 16 is another graph that shows the relationship between electrical angle and induced voltage.

Only a portion of the induced voltage, which is related to the operation of the motor, shown in FIG. 15 is used. FIG. 16 is a graph that shows the relationship between electrical angle and induced voltage. As shown in FIG. 16, the average induced voltage for an electrical angle range of 60° centered on an electrical angle of 90° affects the motor drive. In the first embodiment, as shown in FIG. 16, the average value of an electrical angle range of 60° is defined as induced voltage E. Because the six FETs shown in FIG. 14 are energized over an electrical angle of 360° using six switching patterns (current waveforms), an induced voltage for an electrical angle of 60° is used.

When the number of windings of the coil is given as n and the amount of magnetic flux associated with one winding (turn) of the coil is given as φ, induced voltage E is expressed by the equation below.

$$E = -n\frac{d\varphi}{dt} \quad \text{Mathematical Equation 1}$$

As is understood from Mathematical Equation (1) above, the magnitude of induced voltage E is determined by the amount of change in the magnetic flux. That is, the larger the absolute value of the magnetic flux, the larger is the induced voltage E. In addition, when the rotational speed is high, and in the situation in which the pole count is high and the rate at which the magnetic flux changes is high, the induced voltage E becomes large.

Opening Width and Magnet Width

Figure 17:
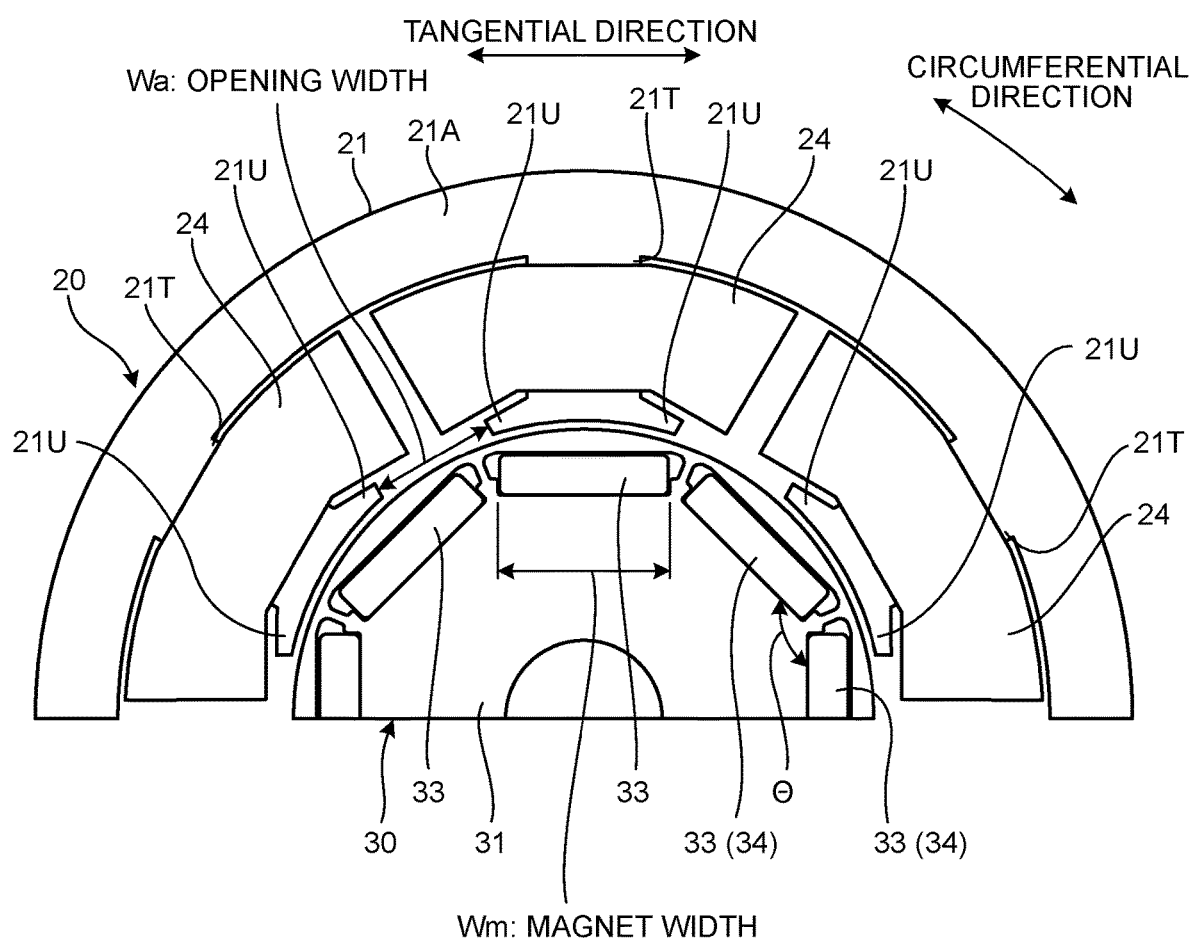
FIG. 17 is a drawing for explaining the dimensions of regions of the motor used in the power source of the electric work machine according to the first embodiment.

FIG. 17 is a drawing for explaining the dimensions of regions of the motor 6 used in (as) the motor power source of the electric work machine 1 according to the present first embodiment. As shown in FIG. 17, the stator core 21 comprises: a yoke 21A, which has a ring shape; teeth 21T, each of which faces radially inward and protrudes radially inward from the inner surface of the yoke 21A; and pole arcs 21U, which protrude in the circumferential direction from the radially-inner-end portion of each of the teeth 21T. The pole arcs 21U protrude toward one side and the other side in the circumferential direction from the radially-inner-end portion of each of the teeth 21T.

In the present first embodiment, when the opening width (in millimeters), which indicates (is defined as) the distance between the first pole arc 21U of the first tooth 21T and the second pole arc 21U disposed adjacent to the first pole arc 21U of the second tooth 21T disposed adjacent to that first tooth 21T in the circumferential direction, is given as Wa and the magnet width (in millimeters), which indicates the dimension (length) of each of the permanent magnets 33 in tangential directions of the rotor 30, is given as Wm, the motor 6 preferably satisfies the condition of Equation (4A) below.

$$0.2 \le Wa/Wm \quad (4A)$$

It is noted that the motor 6 preferably satisfies the condition of Equation (4B) below.

$$0.3 \le Wa/Wm \quad (4B)$$

Figure 18:
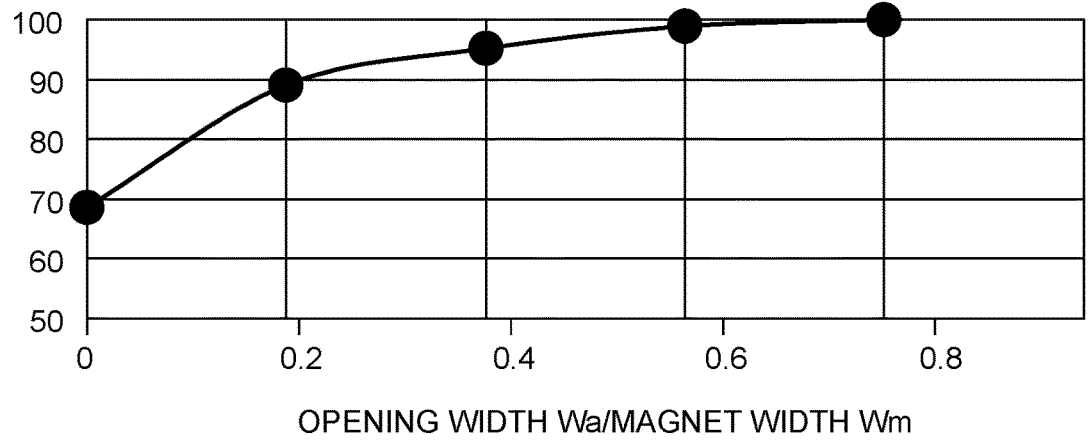
FIG. 18 is a graph that shows the relationship between the ratio of opening width to magnet width and the induced voltage of the motor according to the first embodiment.

FIG. 18 is a graph that shows the relationship between the ratio of opening width Wa (in mm) to magnet width Wm (in mm) and induced voltage Va of the motor 6 according to the first embodiment. It is noted that, in FIG. 18, induced voltage Va is represented on the ordinate as the induced voltage percentage, which is the relative value when induced voltage Va at a stipulated value of opening width Wa is set to 100 [%].

As shown in FIG. 18, the larger the ratio of opening width Wa to magnet width Wm, the larger induced voltage Va becomes. That is, the larger the ratio of opening width Wa to magnet width Wm, the higher the performance of the motor 6 becomes. For example, for a constant magnet width Wm, the larger opening width Wa is, the larger induced voltage Va becomes; and the larger opening width Wa is, the higher the performance of the motor 6 becomes.

Figure 19:
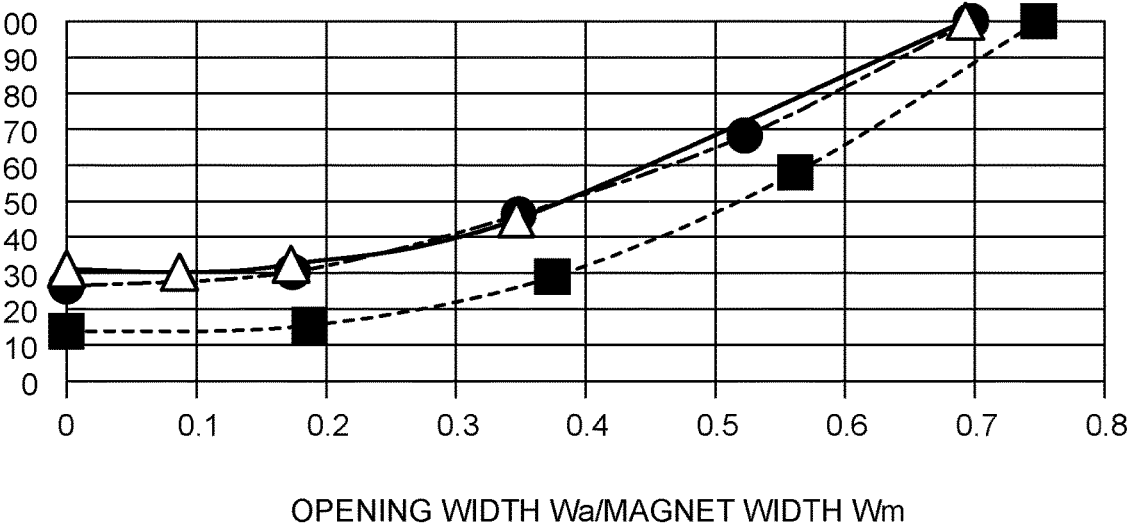
FIG. 19 is a graph that shows the relationship between eddy-current loss and the ratio of opening width to magnet width according to the first embodiment.

FIG. 19 is a graph that shows the relationship between eddy-current losses and the ratio of opening width Wa to magnet width Wm according to the present embodiment. It is noted that, in FIG. 19, eddy-current losses are represented on the ordinate as the eddy-current loss percentage, which is the relative value when eddy-current losses at a stipulated value of opening width Wa are set to 100 [%].

As shown in FIG. 18, although the larger the ratio of opening width Wa to magnet width Wm, the larger induced voltage Va becomes, as shown in FIG. 19, the larger the ratio of opening width Wa to magnet width Wm, the larger the eddy-current losses become. When the eddy-current losses become large during operation, the temperature of the permanent magnets 33 rises (owing to Joule heating in the permanent magnets 33) and, as a result, there is a possibility that the magnetic forces of the permanent magnets 33 will decrease. When the magnetic forces of the permanent magnets 33 decrease, there is a possibility that the performance of the motor 6 will decrease.

It is noted that, in FIG. 19, "SPM ring" indicates the eddy-current loss percentage related to the rotor in which the ring-shaped permanent magnets are disposed around the rotor core. "SPM segment" indicates the eddy-current loss percentage related to the rotor in which the plurality of rectangular-parallelepiped-shaped permanent magnets are fixed to the outer surface of the rotor core. "IPM plate" indicates the eddy-current loss percentage related to the rotor in which the plate-shaped permanent magnets are disposed in the interior of the rotor core, as shown in FIG. 10, etc. Thus, even though the structures of the rotors are different from each other, the tendency that the larger the ratio of opening width Wa to magnet width Wm, the greater the eddy-current losses become is the same.

To improve the performance of the motor 6 in a motor design in which the ratio of opening width Wa to magnet width Wm is large, it is effective to reduce the eddy-current losses. For example, in a motor 6 that satisfies the condition of Equation (4A) or Equation (4B) as well, it is effective to reduce the eddy-current losses. As a result of diligent efforts, the present inventors discovered that, if each one of the magnetic-pole parts 34 is constituted by a plurality of the (discrete, separate) permanent magnets 33, then the eddy-current losses can be reduced, even if the ratio of opening width Wa to magnet width Wm is large.

Transverse Segmentation of Permanent Magnets

Figure 20:
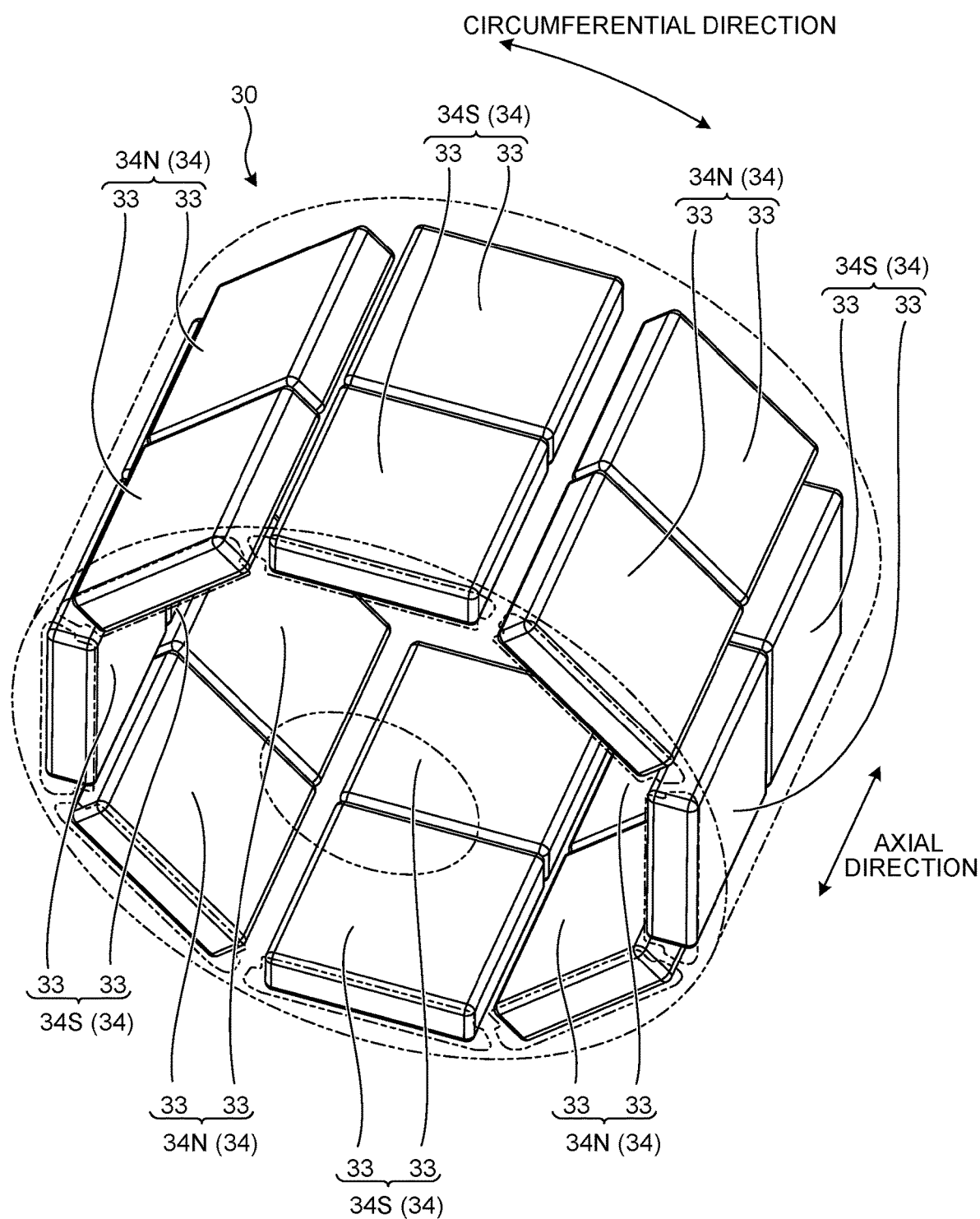
FIG. 20 is an oblique view that shows magnetic-pole parts according to the first embodiment.
Figure 21:
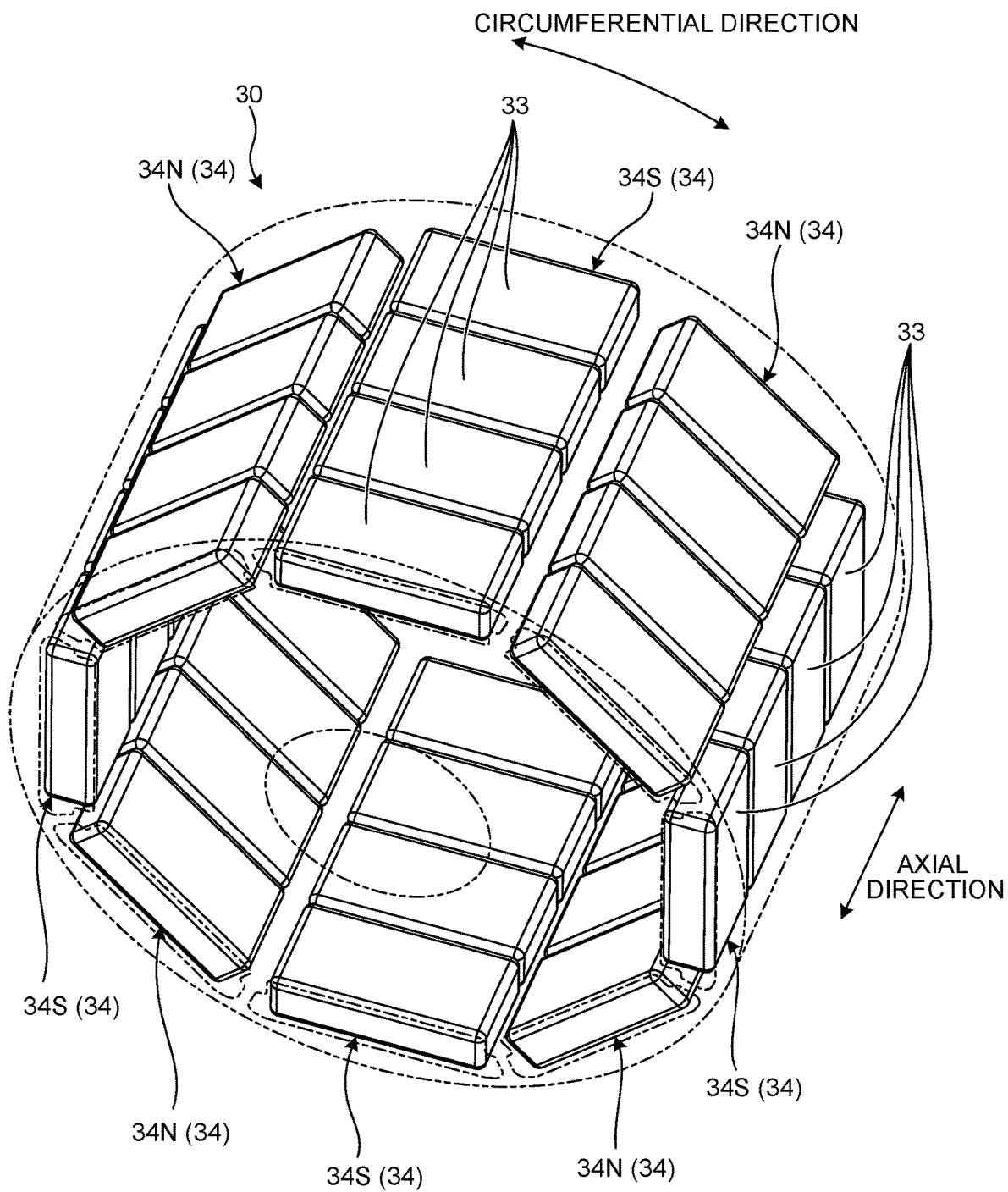
FIG. 21 is an oblique view that shows the magnetic-pole parts according to the first embodiment.

FIG. 20 and FIG. 21 are oblique views that show two different embodiments of the magnetic-pole parts 34 according to the present first embodiment. As described above, the rotor 30 comprises eight of the magnetic-pole parts 34, which are disposed in (around) the circumferential direction. The magnetic-pole parts 34 comprise the first magnetic-pole parts 34N and the second magnetic-pole parts 34S. The first magnetic-pole parts 34N and the second magnetic-pole parts 34S are disposed alternately in (around) the circumferential direction. As shown in FIGS. 20 and 21, in each one of the magnetic-pole parts 34, a plurality of discrete (separate) permanent magnets 33 is disposed in the axial direction. FIG. 20 shows an example in which, in each one of the magnetic-pole parts 34, two of the permanent magnets 33 are disposed (arranged) in the axial direction. FIG. 21 shows an example in which, in each one of the magnetic-pole parts 34, four of the permanent magnets 33 are disposed (arranged) in the axial direction. In each of the respective magnetic-pole parts 34, the discrete permanent magnets 33 are disposed in a coplanar manner.

Each of the (discrete) permanent magnets 33 has a plate shape. Each of the permanent magnets 33 has a rectangular-parallelepiped shape. Each of the permanent magnets 33 is elongated in the circumferential direction, i.e. the width of each permanent magnet 33 in a tangential direction with the circumference of the rotor core 31 is greater than the width of the permanent magnet in the axial or longitudinal direction of the rotor core 31. The dimensions of the plurality of permanent magnets 33 that constitute each one of the magnetic-pole parts 34 are equal to each other. That is, the dimensions (lengths) of the permanent magnets 33 in the axial direction are equal to each other, the dimensions (widths) of the permanent magnets 33 in the circumferential direction (the tangential direction) are equal to each other, and the dimensions (thickness) of the permanent magnets 33 in the radial direction are equal to each other.

In the explanation below, the arrangement of the plurality of permanent magnets 33 in the axial direction shown in FIGS. 20 and 21 is called a transversely segmented arrangement (or laterally divided array) where appropriate, and the number of the permanent magnets 33 disposed in the axial direction in each magnetic-pole part 34 is called the segment count where appropriate. FIG. 20 shows an example in which the permanent magnets 33 are arranged transversely segmented with a segment count of two. FIG. 21 shows an example in which the permanent magnets 33 are arranged transversely segmented with a segment count of four.

Figure 22:
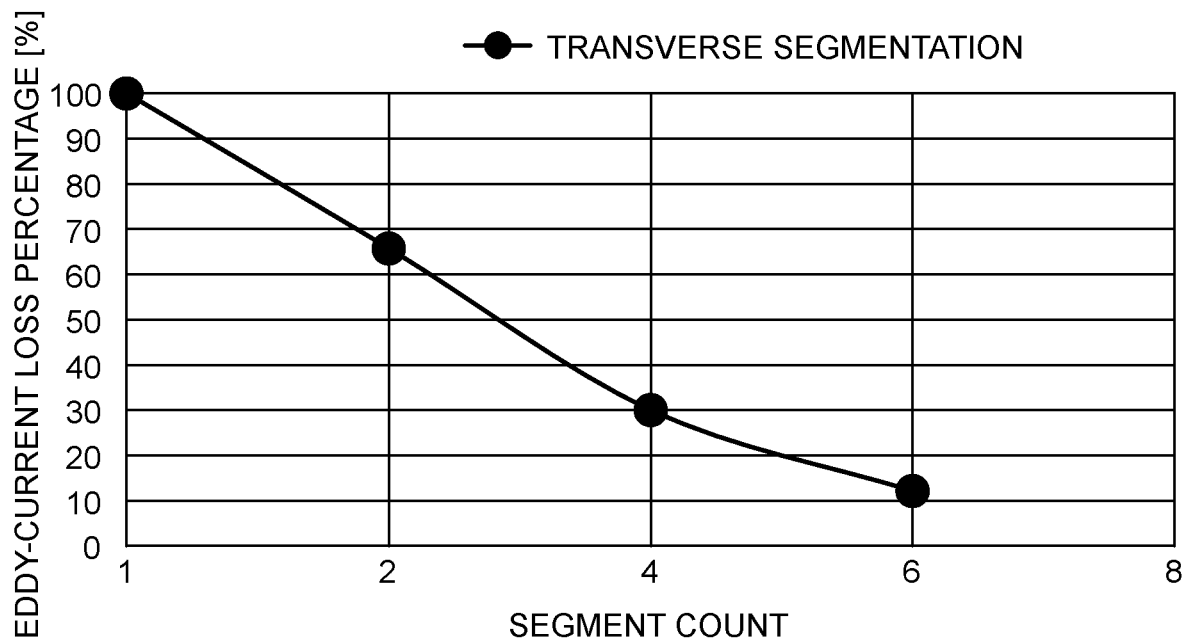
FIG. 22 is a graph that shows the relationship between segment count and eddy-current loss percentage in a transversely (laterally) segmented arrangement according to the first embodiment.

FIG. 22 is a graph that shows the relationship between segment count and eddy-current loss percentage in transversely segmented arrangements according to the present embodiment. As shown in FIG. 22, the greater the segment count, the more the eddy-current loss percentage can be reduced.

It is noted that, if the motor 6 is designed to satisfy the condition of Equation (4A) described above, each one of the magnetic-pole parts 34 may be constituted as at least three of the (discrete) permanent magnets 33 disposed in the axial direction in each magnetic-pole part 34. That is, as shown in FIG. 18, if the motor 6 is designed to satisfy the condition of Equation (4A), the eddy-current loss percentage tends to increase. Consequently, if the motor 6 has been designed to satisfy the condition of Equation (4A), eddy-current losses can be effectively reduced by constituting each one of the magnetic-pole parts 34 as at least three of the (discrete) permanent magnets 33 disposed in (along) the axial direction, preferably with a gap or spacing or distance therebetween that inhibits eddy currents from being conducted from one (discrete) permanent magnet 33 to another.

It is noted that, in the situation in which the design of the motor 6 satisfies the condition of Equation (4B) described above, each one of the magnetic-pole parts 34 may comprise at least two of the (discrete) permanent magnets 33 disposed in (along) the axial direction in each magnetic-pole part 34. That is, as shown in FIG. 18, if the design of the motor 6 satisfies the condition of Equation (4B), the eddy-current loss percentage tends to increase. Consequently, if the motor 6 has been designed to satisfy the condition of Equation (4B), eddy-current losses can be effectively reduced by constituting each one of the magnetic-pole parts 34 as at least two or three of the permanent magnets 33 disposed in the axial direction in each magnetic-pole part 34.

Longitudinal Segmentation of Permanent Magnets

Figure 23:
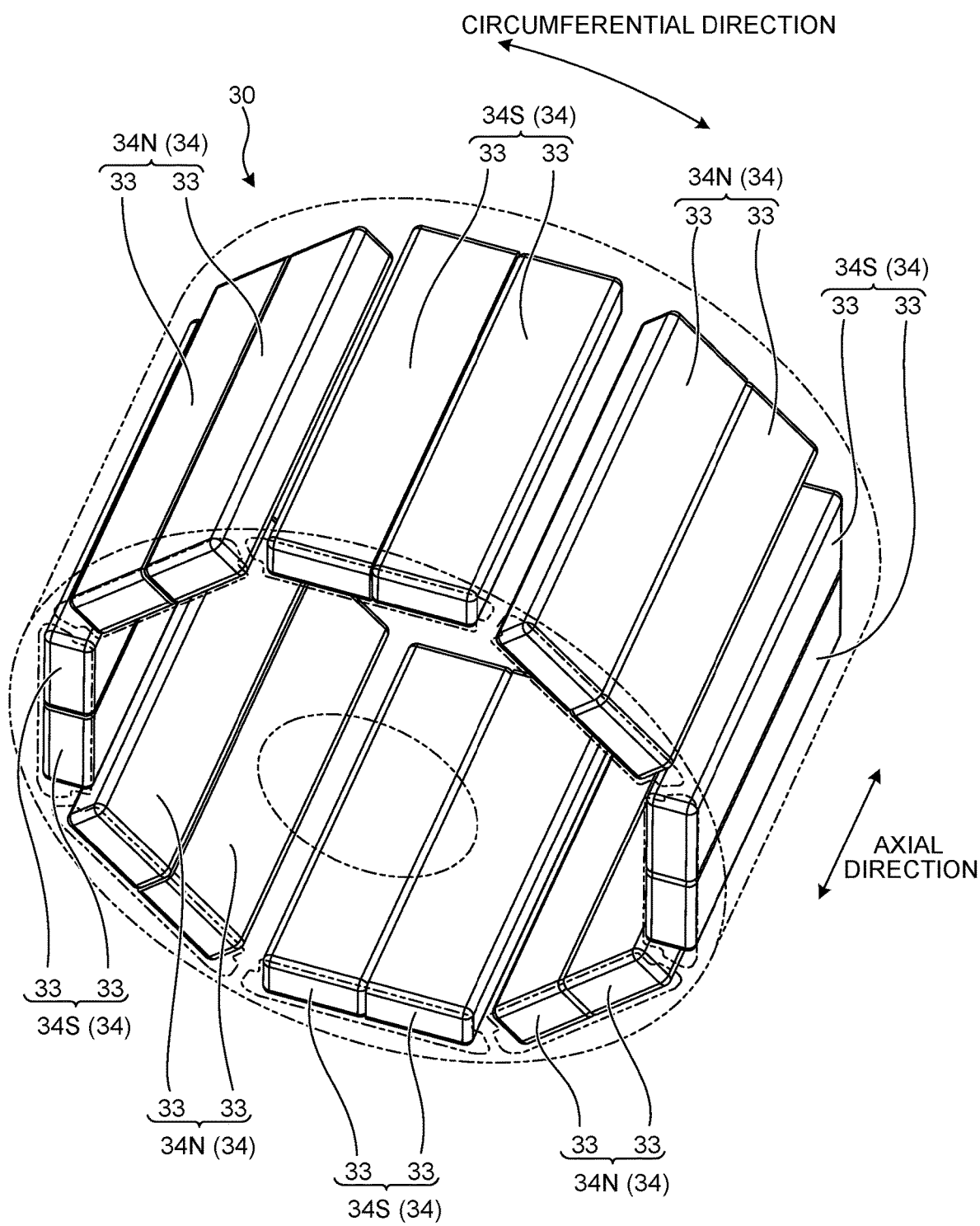
FIG. 23 is an oblique view that shows the magnetic-pole parts according to the first embodiment.

FIG. 23 is an oblique view that shows the magnetic-pole parts 34 according to another modification of the first embodiment. As shown in FIG. 23, in each one of the magnetic-pole parts 34, a plurality of permanent magnets 33 may be disposed (arranged) in the circumferential direction. FIG. 23 shows an example in which, in each one of the magnetic-pole parts 34, two of the (discrete) permanent magnets 33 are disposed in the circumferential direction. It is noted that, in the example shown in FIG. 23 as well, the design of the motor 6 satisfies the condition of Equation (4A) described above.

Each of the permanent magnets 33 has a plate shape. Each of the permanent magnets 33 has a rectangular-parallelepiped shape. Each of the permanent magnets 33 is elongated in the axial direction, i.e. the length of each of the discrete permanent magnets 33 is longer in the axial or longitudinal direction of the rotor core 31 than the width of the discrete permanent magnets 33 in a tangential direction to the circumference of the rotor core 31. The dimensions of the plurality of permanent magnets 33 that constitute each one of the magnetic-pole parts 34 are equal to each other. That is, the dimensions (lengths) of the permanent magnets 33 in the axial direction are equal to each other, the dimensions (widths) of the permanent magnets 33 in the circumferential direction (the tangential direction) are equal to each other, and the dimensions (thicknesses) of the permanent magnets 33 in the radial direction are equal to each other. In each of the respective magnetic-pole parts 34, the discrete permanent magnets 33 are disposed in a coplanar manner.

In the explanation below, the arrangement of the plurality of permanent magnets 33 in the circumferential direction is called a longitudinally segmented arrangement (or axially segmented array) where appropriate, and the number of the permanent magnets 33 disposed in the circumferential direction in each magnetic-pole part 34 is called the segment count where appropriate. FIG. 23 shows an example in which the permanent magnets 33 are arranged longitudinally segmented with a segment count of two.

Figure 24:
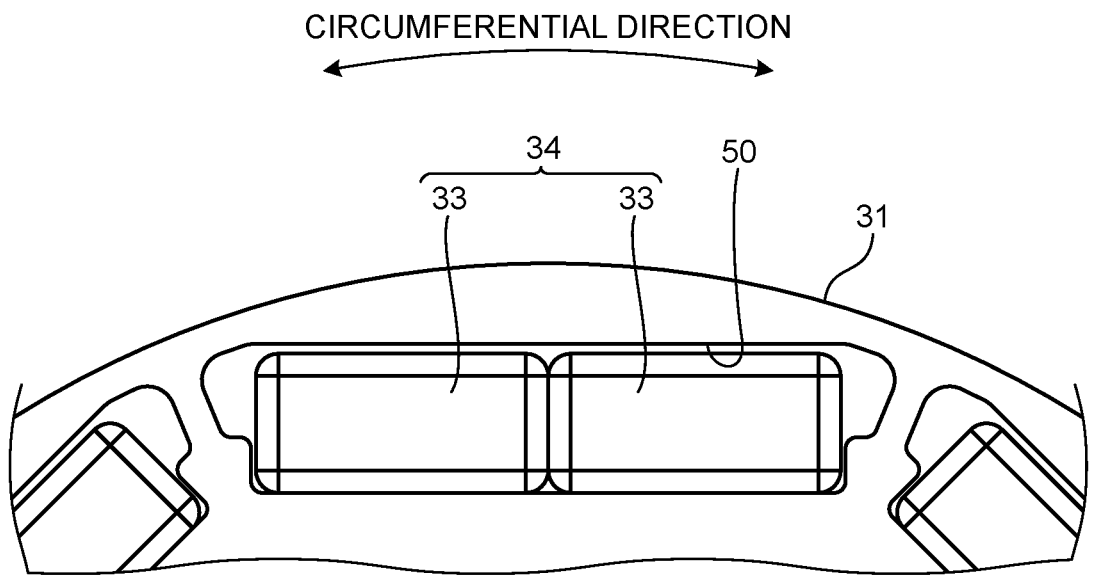
FIG. 24 is a drawing, viewed from an axial direction, of the magnetic-pole parts according to the first embodiment.

FIG. 24 is a drawing, viewed from the axial direction, of the magnetic-pole parts 34 according to the present embodiment. As shown in FIG. 24, the two (plurality of) permanent magnets 33 that constitute one of the magnetic-pole parts 34 preferably are inserted into one of the magnet holes 50. A seam between the two discrete permanent magnet 34 can be seen, even though the two discrete permanent magnets 34 are abutting. Such abutment is permissible as long as eddy currents do not appreciably conduct or pass between the two discrete permanent magnets 33.

Figure 25:
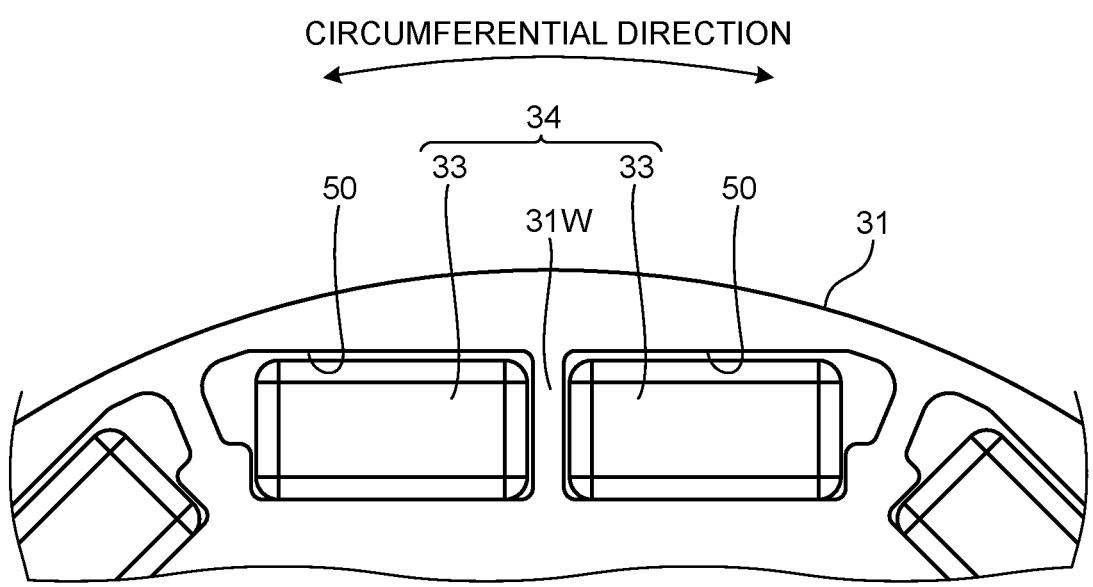
FIG. 25 is a drawing, viewed from the axial direction, of the magnetic-pole parts according to a modified example of the first embodiment.

FIG. 25 is a drawing, viewed from the axial direction, that shows the magnetic-pole parts 34 according to a further modified example of the present embodiment containing longitudinally segmented permanent magnets 33. As shown in FIG. 25, a portion of the rotor core 31 may be disposed between the two permanent magnets 33 that constitute one of the magnetic-pole parts 34. That is, a portion of the rotor core 31 may function as a partition wall 31W that separates the two permanent magnets 33. Thus, a gap or spacing or distance is provided between the two discrete permanent magnets 33 of each magnetic-pole part 34. Here, the partition wall 31W is made of a conductive material, but it serves to inhibit eddy currents from conducting or passing between the two discrete permanent magnets 33 of each magnetic-pole part 34.

Figure 26:
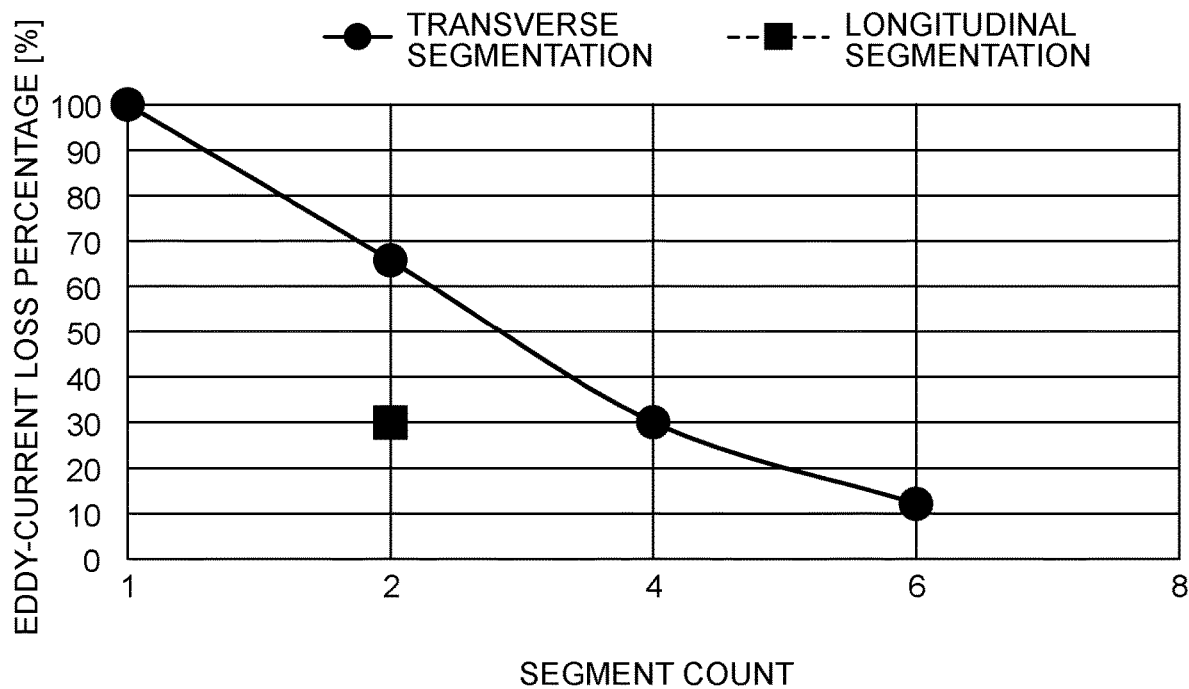
FIG. 26 is a graph that shows the relationship between segment count and eddy-current loss percentage in a longitudinally segmented arrangement according to the first embodiment.

FIG. 26 is a graph that shows the relationship between segment count and eddy-current loss percentage in longitudinally segmented arrangements according to the present embodiment. It is noted that, in FIG. 26, the relationship between segment count and eddy-current loss percentage in the transversely segmented arrangement is also recorded.

As shown in FIG. 26, in the case of a transversely segmented arrangement having a segment count of four and in the case of a longitudinally segmented arrangement having a segment count of two, the eddy-current loss percentages are substantially the same. That is, depending on the structure of the rotor 30, the eddy-current loss percentage can be reduced more in longitudinally segmented arrangements having a smaller segment count than in the transversely segmented arrangements. In other words, longitudinal segmentation of the permanent magnets 33 in each magnetic-pole part 34 leads to a greater reduction of eddy-current losses than traverse (lateral) segmentation for the same number of segment counts.

Total Peripheral Length of Permanent Magnets

Figure 27:
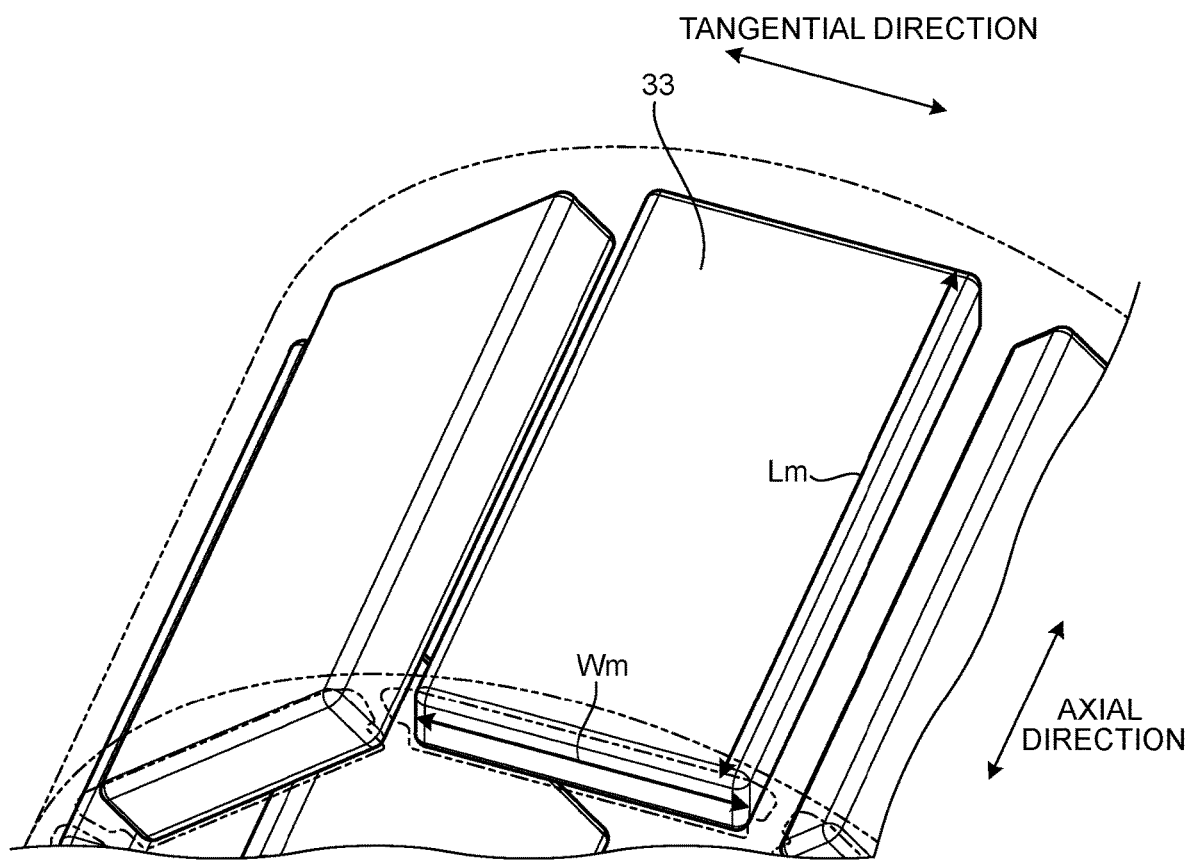
FIG. 27 is a drawing for explaining the total peripheral length of permanent magnets according to the first embodiment.

The present inventors discovered that the total peripheral length of the permanent magnets 33 also influences the effect of reducing the eddy loss percentage. FIG. 27 is a drawing for explaining the total peripheral length of the permanent magnets 33 according to the present embodiment. As shown in FIG. 27, when the magnet width (in millimeters), which indicates (is defined as) the dimension of each of the permanent magnets 33 in the tangential direction of the rotor 30, is given as Wm and the magnet length (in millimeters), which indicates (is defined as) the dimension of each of the permanent magnets 33 in the axial direction of the rotor 30, is given as Lm, total peripheral length Lt of each of the permanent magnets 33 is expressed by Equation (5) below.

$$Lt = 2 \times (Wm + Lm) \tag{5}$$

The present inventors discovered that, when the ratio of the total peripheral length when the permanent magnets 33 are not segmented to the total peripheral length when the permanent magnets 33 are segmented is given as the total peripheral length percentage, the eddy loss percentage is a value that is approximated by (in proportion to) the square of the inverse of the Lt percentage, i.e. (1/total peripheral length percentage)². FIG. 28 is a table that shows the relationships among segment count, total peripheral length, total peripheral length percentage, and eddy loss percentage according to the present first embodiment.

Whether the permanent magnets 33 are transversely segmented or longitudinally segmented may be made by calculating the relationships among the total peripheral lengths and segmenting the permanent magnets 33 in the direction that yields an advantageous result.

In a transversely segmented arrangement, that is, in an embodiment in which, in each one of the magnetic-pole parts 34, a plurality of the permanent magnets 33 is disposed in (along) the axial direction, it is preferable to dispose the permanent magnets 33 such that the condition of Equation (6) below is satisfied. On the other hand, in a longitudinally segmented arrangement, that is, in an embodiment in which, in each one of the magnetic-pole parts 34, a plurality of the permanent magnets 33 is disposed in the circumferential direction, it is preferable to dispose the permanent magnets 33 such that the condition of Equation (7) below is satisfied. In Equation (6) and Equation (7), Pn is the pole count, which is the total number of magnetic-pole parts 34.

$$2 \times (Wm + Lm/Pn) \times Pn \geq 2 \times (Wm/Pn + Lm) \times Pn \quad (6)$$

$$2 \times (Wm/Pn + Lm) \times Pn \geq 2 \times (Wm + Lm/Pn) \times Pn \quad (7)$$

Effects

In the present first embodiment as explained above, the electric work machine 1 comprises: the motor 6, which is an inner-rotor-type brushless motor, comprising the rotor 30 and the stator 20, which is disposed around the rotor 30; and the saw chain 10, which is the output part that is directly or indirectly driven by the rotor 30. The rotor 30 comprises the rotor core 31 and the plurality of magnet-pole parts 34, which are disposed in (around) the circumferential direction of the rotor core 31. The stator 20 comprises the stator core 21, the front insulator 22 and the rear insulator 23, which are fixed to the stator core 21, and the coils 24, which are wound on the teeth 21T of the stator core 21 via the front insulator 22 and the rear insulator 23. The magnetic-pole parts 34 include the first magnetic-pole parts 34N and the second magnetic-pole parts 34S, which are disposed alternately in the circumferential direction and the magnetic poles of which differ from each other. Each one of the magnetic-pole parts 34 is constituted by a plurality of discrete permanent magnets 33.

According to the above-mentioned configuration, eddy-current losses can be reduced by constituting each one of the magnetic-pole parts 34 as a plurality of discrete permanent magnets 33. Consequently, the temperature of the permanent magnets 33 is less likely to rise during operation, thereby avoiding a reduction in the magnetic forces of the permanent magnets 33. Accordingly, motor performance can be improved.

In the present first embodiment, when the induced voltage of the motor 6 is given as Va, the power-supply voltage of the motor 6 is given as Vb, the rotational speed of the motor 6 is given as ω, the first induced voltage constant, which is expressed by (calculated according to) Va/ω, is given as Ea [V/krpm], the pole-pairs count, which indicates (is defined as) the number of the first magnetic-pole parts 34N or of the second magnetic-pole parts 34S, is given as Pi, and the second induced voltage constant, which is expressed by (calculated according to) Ea/Pi, is given as Eb [V/krpm·pole-pairs count], the condition of Eb≤0.025×Vb is preferably satisfied.

According to the above-mentioned configuration, eddy-current losses can be reduced in a motor 6, which can be suitably used in an electric work machine 1 according to the present teachings. An example of a motor 6 that satisfies the condition expressed in Equation (3) is a brushless motor having a pole count, i.e. the total number of magnetic-pole parts 34, of eight and a rotational speed co of 10,000 rpm or more.

In one exemplary example of the present first embodiment, in each one of the magnetic-pole parts 34, a plurality of discrete permanent magnets 33 is disposed in (along) the axial direction, i.e. a transversely segmented arrangement.

According to the above-mentioned configuration, eddy-current losses can be reduced by constituting each one of the magnetic-pole parts 34 as a plurality of the permanent magnets 33 disposed in the axial direction. The number of permanent magnets 33 disposed in the axial direction may be two, may be three, may be four, or may be an arbitrary plurality of five or more.

Preferably, each one of the magnetic-pole parts 34 is constituted by at least three of the permanent magnets 33 disposed in (along) the axial direction.

In the above-mentioned configuration, eddy-current losses can be reduced by constituting each one of the magnetic-pole parts 34 as at least three of the permanent magnets 33 disposed in the axial direction.

In the present first embodiment, the stator core 21 comprises the pole arcs 21U, which protrude in the circumferential direction from the radially-inward-end portions of the teeth 21T. When the opening width, which indicates (is defined as) the distance between the first pole arc 21U of the first tooth 21T and the second pole arc 21U disposed adjacent to the first pole arc 21U of the second tooth 21T disposed adjacent to that first tooth 21T in the circumferential direction, is given as Wa and the magnet width, which indicates (is defined as) the dimension of each of the permanent magnets 33 in the tangential direction of the rotor 30, is given as Wm, the condition of 0.2≤Wa/Wm is preferably satisfied.

According to the above-mentioned configuration, eddy-current losses can be effectively reduced. That is, under the condition of [0.2≤Wa/Wm] expressed in Equation (4A), eddy-current losses tend to increase. However, even under the condition of [0.2≤Wa/Wm], eddy-current losses can be effectively reduced by constituting each one of the magnetic-pole parts 34 as at least three of the permanent magnets 33 disposed in the axial direction.

In the alternative, each one of the magnetic-pole parts 34 is constituted by at least two of the permanent magnets 33 disposed in (along) the axial direction.

In the above-mentioned configuration, eddy-current losses can still be reduced by constituting each one of the magnetic-pole parts 34 as at least two of the permanent magnets 33 disposed in (along) the axial direction.

In such an embodiment, the stator core 21 comprises the pole arcs 21U, which protrude in the circumferential direction from the inner-end portions of the teeth 21T in the radial direction. When the opening width, which indicates (is defined as) the distance between the first pole arc 21U of the first tooth 21T and the second pole arc 21U disposed adjacent to the first pole arc 21U of the second tooth 21T disposed adjacent to that first tooth 21T in the circumferential direction, is given as Wa and the magnet width, which indicates (is defined as) the dimension of each of the permanent magnets 33 in the tangential direction of the rotor 30, is given as Wm, the condition of 0.3≤Wa/Wm is preferably satisfied.

According to the above-mentioned configuration, eddy-current losses can be effectively reduced. That is, under the condition of [0.3≤Wa/Wm] expressed in Equation (4B), eddy-current losses tend to increase. However, even under the condition of [0.3≤Wa/Wm], eddy-current losses can still be effectively reduced by constituting each one of the magnetic-pole parts 34 as at least two of the permanent magnets 33 disposed in the axial direction.

In the present first embodiment, the pole count, which indicates (is defined as) the total number of magnetic-pole parts 34, is six or more.

Even in the above-mentioned configuration, eddy-current losses can still be effectively reduced. That is, if the pole count of six or more, eddy-current losses tend to increase. However, even if the pole count of six or more, eddy-current losses can be effectively reduced by constituting each one of the magnetic-pole parts 34 as a plurality of the permanent magnets 33.

In the present embodiment, when the magnet length, which indicates (is defined as) the dimension of each of the permanent magnets 33 in the axial direction of the rotor 30, is given as Lm and the pole count, which indicates (is defined as) the total number of magnetic-pole parts 34, is given as Pn, the condition of 2×(Wm+Lm/Pn)×Pn≥2×(Wm/Pn+Lm)×Pn is preferably satisfied.

According to the above-mentioned configuration, when each one of the magnetic-pole parts 34 is constituted by a plurality of the permanent magnets 33 disposed in (along) the axial direction, eddy-current losses can be effectively reduced by satisfying the condition of [2×(Wm+Lm/Pn)×Pn≥2×(Wm/Pn+Lm)×Pn] expressed in Equation (6).

In a different modification of the present first embodiment, in each one of the magnetic-pole parts 34, a plurality of discrete permanent magnets 33 is disposed in (around) the circumferential direction.

According to the above-mentioned configuration, eddy-current losses can be reduced by constituting each one of the magnetic-pole parts 34 as a plurality of the permanent magnets 33 disposed in (around) the circumferential direction. The number of permanent magnets 33 disposed in the circumferential direction may be two, may be three, may be four, or may be an arbitrary plurality of five or more.

In this modification, each one of the magnetic-pole parts 34 may be constituted by at least two of the permanent magnets 33 disposed in (around) the circumferential direction.

In the above-mentioned configuration, eddy-current losses can be reduced by constituting each one of the magnetic-pole parts 34 as at least two of the permanent magnets 33 disposed in the circumferential direction.

In this modification, the stator core 21 may comprise the pole arcs 21U, which protrude in the circumferential direction from the inner-end portions of the teeth 21T in the radial direction. When the opening width, which indicates (is defined as) the distance between the first pole arc 21U of the first tooth 21T and the second pole arc 21U disposed adjacent to the first pole arc 21U of the second tooth 21T disposed adjacent to that first tooth 21T in the circumferential direction, is given as Wa and the magnet width, which indicates (is defined as) the dimension of each of the permanent magnets 33 in the tangential direction of the rotor 30, is given as Wm, the condition of 0.2≤Wa/Wm is preferably satisfied.

According to the above-mentioned configuration, eddy-current losses can be effectively reduced. That is, under the condition of [0.2≤Wa/Wm] expressed in Equation (4A) above, eddy-current losses tend to increase. However, even under the condition of [0.2≤Wa/Wm], eddy-current losses can still be effectively reduced by constituting each one of the magnetic-pole parts 34 as at least two of the permanent magnets 33 disposed (arranged, spaced apart) in the circumferential direction.

In this modification, the pole count, which indicates (is defined as) the total number of magnetic-pole parts 34, also may be six or more.

Even in the above-mentioned configuration, eddy-current losses can be effectively reduced. That is, if the pole count of six or more, eddy-current losses tend to increase. However, even if the pole count of six or more, eddy-current losses can still be effectively reduced by constituting each one of the magnetic-pole parts 34 as a plurality of discrete permanent magnets 33 that are segmented longitudinally.

In this modification, when the magnet length, which indicates (is defined as) the dimension of each of the permanent magnets 33 in the axial direction of the rotor 30, is given as Lm and the pole count, which indicates (is defined as) the total number of magnetic-pole parts 34, is given as Pn, the condition of 2×(Wm/Pn+Lm)×Pn≥2×(Wm+Lm/Pn)×Pn is preferably satisfied.

According to the above-mentioned configuration, when each one of the magnetic-pole parts 34 is constituted by (as) a plurality of the permanent magnets 33 disposed in the circumferential direction, eddy-current losses can be effectively reduced by satisfying the condition of [2×(Wm/Pn+Lm)×Pn≥2×(Wm+Lm/Pn)×Pn] expressed in Equation (7).

Second Embodiment

A second embodiment of the present teachings will now be explained. In the explanation below, structural elements that are identical or equivalent to those in the embodiment described above are assigned identical symbols, and explanations of those structural elements are simplified or omitted.

Submerged Amount of Permanent Magnets

In the first embodiment described above, an example was explained in which, to reduce eddy-current losses when the ratio of opening width Wa to magnet width Wm is large, each one of the magnetic-pole parts 34 is constituted as a plurality of the permanent magnets 33. The present inventors further discovered that, when each one of the magnetic-pole parts 34 is constituted as one or a plurality of the permanent magnets 33, eddy-current losses can further be reduced by shifting the locations of the permanent magnets 33 radially inward. Therefore, overall eddy-current losses can be further reduced, even if the ratio of opening width Wa to magnet width Wm is large.

FIG. 29 is a conceptual diagram for explaining the term "submerged amount" according to the present embodiment. As was mentioned above, by shifting the locations of the permanent magnets 33 radially inward from [State 1] to [State 2] shown in FIG. 29, eddy-current losses can be reduced.

It is noted that, in the present second embodiment as well, the motor 6 may be designed to satisfy the condition of Equation (4A) described above.

It is noted that, in embodiments in which the submerged amount is adjusted to reduce eddy-current losses, angle θ, which is formed between the permanent magnet 33 of the first magnetic-pole part 34N and the permanent magnet 33 of the second magnetic-pole part 34S that are mutually adjacent to each other as shown in FIG. 17, preferably satisfies the condition of Equation (8) below. In Equation (8), Pn is the pole count, which indicates (is defined as) the total number of magnetic-pole parts 34.

$$\theta = 180[°] \times (Pn-2)/Pn \quad (8)$$

Equation (8) means that each of the permanent magnets 33, which is disposed in one magnet hole 50, will be disposed such that it (they) extend(s) in a tangential direction with respect to the outer circumference of the rotor core 31.

Figure 30:
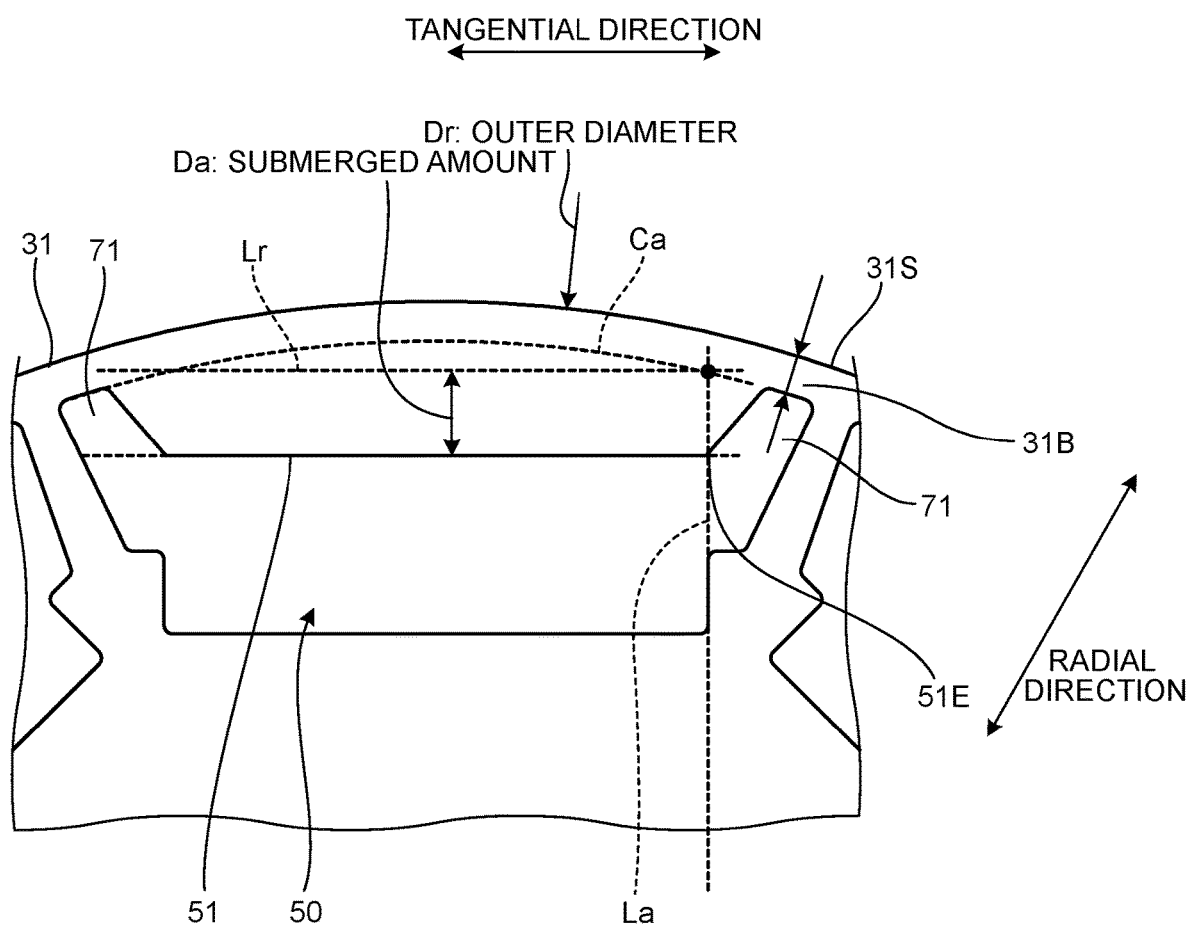
FIG. 30 is a drawing for explaining the "submerged amount" according to the second embodiment.

FIG. 30 is a drawing for explaining the term "submerged amount Da" according to the present embodiment. As shown in FIG. 30, the rotor core 31 has the magnet holes 50 (only one shown in FIG. 30), in which at least one permanent magnet 33 is respectively disposed. Each of the magnet holes 50 has an outer-side support surface 51, which faces radially outward and opposes (faces) the outer surface(s) of the permanent magnet(s) 33. Within a plane orthogonal to rotational axis AX, the outer-side support surface 51 is parallel to a tangential direction of the rotor core 31. Within the magnet hole 50, the gaps 71 are formed radially outward of the outer-side support surface 51. A bridge part 31B of the rotor core 31 is disposed between the outer surface 31S of the rotor core 31 and the radially-outer-end portions of the gaps 71.

Virtual circle Ca that passes through the radially-inner-end portion of the bridge part 31B is defined within a plane orthogonal to rotational axis AX. Within a plane orthogonal to rotational axis AX, the outer-side support surface 51 has edges 51E at its boundaries with the gaps 71. The edges 51E coincide with end portions of the permanent magnet 33 in the tangential direction. First virtual line La that passes through an edge 51E is defined within a plane orthogonal to rotational axis AX. Within a plane orthogonal to rotational axis AX, first virtual line La is defined such that it is orthogonal to the outer-side support surface 51. Second virtual line Lr, which passes through the point of intersection between virtual circle Ca and first virtual line La and extends in a direction parallel to the outer-side support surface 51, is defined within a plane orthogonal to rotational axis AX. Second virtual line Lr is the reference line Lr of submerged amount Da. Submerged amount Da refers to the distance between reference line Lr and the outer-side support surface 51 in the radial direction.

When the outer diameter of the rotor core is given as Dr, submerged amount Da is prescribed such that the condition of Equation (9) below is preferably satisfied.

$$0.017 \leq Da/Dr \quad (9)$$

Figure 31:
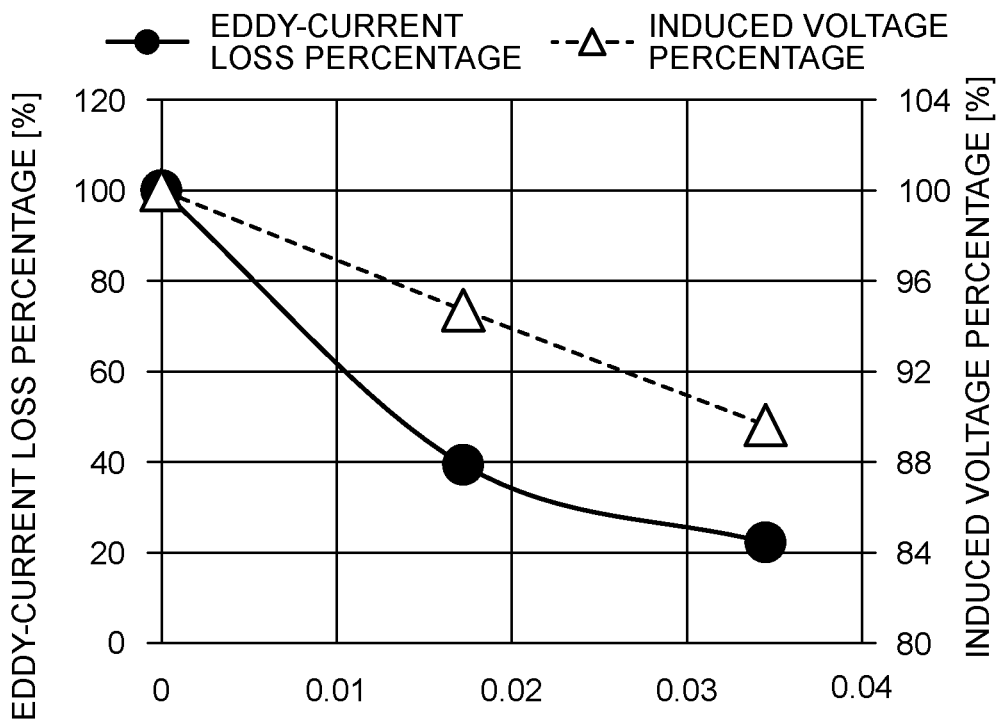
FIG. 31 is a graph that shows the relationships among the ratio of the submerged amount to the outer diameter of the rotor core, the eddy-current loss percentage, and the induced voltage percentage according to the second embodiment.

FIG. 31 is a graph that shows the relationships among the ratio of submerged amount Da to outer diameter Dr of the rotor core 31, the eddy-current loss percentage, and the induced voltage percentage according to the present second embodiment. As shown in FIG. 31, the larger the ratio of submerged amount Da to outer diameter Dr of the rotor core 31, the smaller the eddy-current loss percentage and the induced voltage percentage each become. However, the eddy-current loss percentage decreases more steeply than the induced voltage percentage does. Consequently, by shifting the locations of the permanent magnets 33 radially inward, the eddy-current loss percentage can be reduced without causing the induced voltage percentage to significantly decrease. That is, by shifting (moving) the locations of the permanent magnets 33 radially inward, the eddy-current loss percentage can be reduced without causing the performance of the motor 6 to significantly decrease.

Effects

In the present second embodiment as explained above, the magnetic-pole parts 34 comprise the first magnetic-pole parts 34N and the second magnetic-pole parts 34S, which are disposed alternately in the circumferential direction and the magnetic poles of which differ from each other. The magnetic-pole parts 34 are each constituted by the discrete permanent magnets 33, which are disposed in the interior of the rotor core 31. When the pole count, which indicates (is defined as) the total number of magnetic-pole parts 34, is given as Pn, and the angle formed between the permanent magnets 33 of the first magnetic-pole parts 34N and the permanent magnets 33 of the second magnetic-pole parts 34S that are adjacent to each other is given as θ, the condition of θ=180[°]×(Pn−2)/Pn is preferably satisfied.

According to the above-mentioned configuration, eddy-current losses can be reduced by satisfying the condition of [θ=180[°]×(Pn−2)/Pn] expressed in Equation (8). Consequently, a rise in the temperature of the permanent magnets 33 is curtailed during operation, thereby avoiding or minimizing a decrease in the magnetic forces of the permanent magnets 33. Accordingly, motor performance can be improved.

In the present second embodiment, submerged amount Da and outer diameter Dr of the rotor core preferably satisfy the condition of 0.017≤Da/Dr.

According to the above-mentioned configuration, eddy-current losses can be reduced by shifting the locations of the permanent magnets 33 radially inward such that the condition of [0.017≤Da/Dr] expressed in Equation (9) is satisfied.

Other Embodiments

Figure 32:
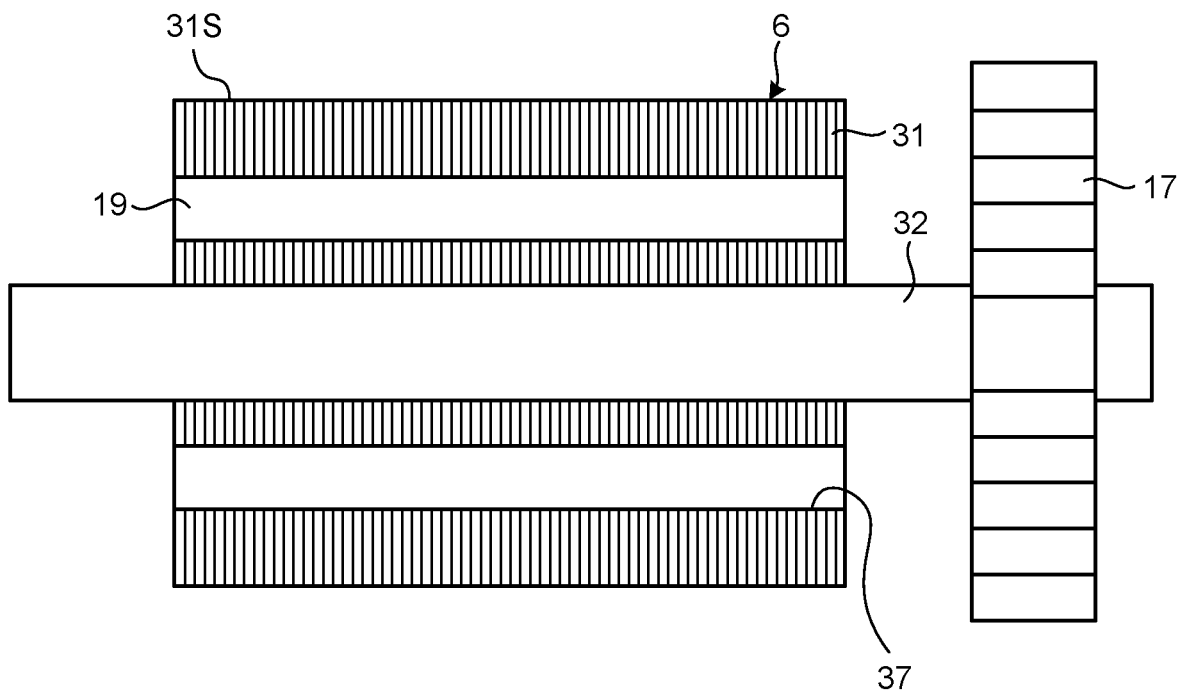
FIG. 32 is a schematic drawing that shows a cross-sectional structure of the motor.

FIG. 32 is a schematic drawing that shows a cross-sectional structure of a motor 6. The rotor core 31 of a first modified embodiment as shown in FIG. 32 comprises: a shaft opening 37, in which the rotor shaft 32 is disposed; and a plurality of through holes 19 formed in the radial direction between the shaft opening 37 and the outer surface 31S of the rotor core 31. According to the above-mentioned configuration, when the rotor 30 rotates, air circulates through the through holes 19. Thereby, a rise in the temperature of the permanent magnets 33 during operation is curtailed, thereby avoiding or minimizing a decrease in the magnetic forces of the permanent magnets 33. Accordingly, motor performance can be improved.

Figure 33:
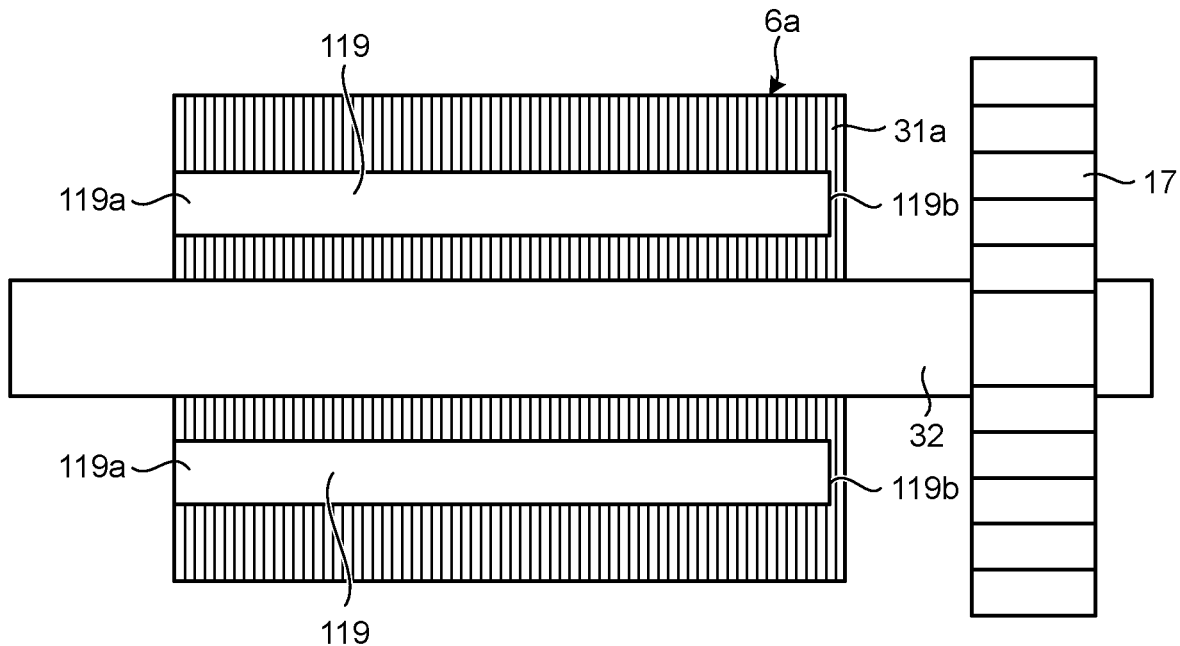
FIG. 33 is a schematic drawing that shows a cross-sectional structure of another motor.

As shown in FIG. 32, although the motor 6 preferably is provided with the through holes 19, which pass entirely through the rotor core 31 in the axial direction, motors 6 according to the present teachings are not limited thereto. As an exemplary modification, blind holes (119), each of which extend in the axial direction and only one end of which is open, may be provided in the rotor core 31; FIG. 33 shows a schematic drawing of a cross-sectional structure of such a modified motor 6a. With regard to the motor 6a shown in FIG. 33, the blind holes 119 are formed in a rotor core 31a. The blind holes 119 extend in the axial direction of the rotor shaft 32; an end part 119a of each blind hole 119, which is on the side opposite that of the fan 17, is open, and an end part 119b of each blind hole 119, which is on the side of the fan 17, is closed up in the interior of the rotor core 31a. Thus, by providing the blind holes 119, the end parts 119b of which are closed up, air flows in the interior of each of the blind holes 119, and thereby a rise in the temperature of the permanent magnets 33 during operation can be reduced, thereby avoiding or minimizing a decrease in the magnetic forces of the permanent magnets 33. Accordingly, motor performance can be improved.

Figure 34:
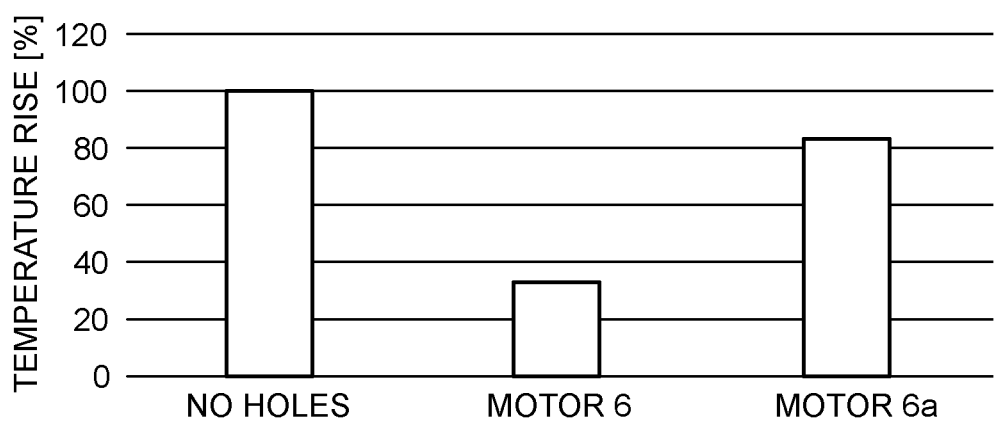
FIG. 34 is a chart for explaining one example of the relationship between hole structure and temperature rise of the motor.

FIG. 34 is a chart for explaining examples of the relationship between hole structure and temperature rise of the motor. FIG. 34 shows, for three different motors that were driven for a fixed time using an electric current of 20 A, the result of comparing the temperature rise for a motor in which holes were not formed in the rotor core 31, the above-described motor 6 comprising the through holes 19, and the above-described motor 6a comprising the blind holes 119. As shown in FIG. 34, when the motor not provided with holes was assigned a temperature rise of 100%, it was understood that the temperature rise could be reduced to approximately 30% thereof by providing the through holes 19 and could be reduced to approximately 80% thereof by providing the blind holes 119. Thereby, the amount of temperature rise of the motor can be reduced by providing holes in the rotor core.

It is noted that, in the embodiments described above, it was assumed that the motor 6 is an interior permanent magnet (IPM) motor. However, the motor 6 may instead be a surface permanent magnet (SPM) motor, in which the permanent magnets are affixed to (on) the outer surface of the rotor core 31.

In the embodiments described above, it was assumed that the electric work machine 1 is a chain saw, which is one type of horticultural tool (outdoor power equipment). Horticultural tools or outdoor power equipment according to the present teachings are not limited to a chain saw. Illustrative examples of other types of horticultural tools according to the present teachings include hedge trimmers, lawn mowers, mowing machines, and blowers.

In the embodiments described above, it was assumed that the electric work machine 1 is a horticultural tool. However, electric work machines 1 according to the present teachings may be power tools. Illustrative examples of other types of power tools according to the present teachings include impact drivers, driver-drills, hammer driver-drills, angle drills, screwdrivers, hammers, hammer drills, circular saws, reciprocating saws, etc.

In the embodiments described above, the electric work machine may be a vacuum cleaner.

In the embodiments described above, it was assumed that the battery packs 12, which are mounted on the battery-mounting parts, are used as the power supply of the electric work machine. However, a commercial power supply (AC power supply) may instead be used as the power supply of the electric work machine.

In the embodiments described above, the materials (e.g., sintered NdFeB) of the segmented permanent magnets 33 are preferably separated by a solid material or a gas (e.g., air) that has sufficiently high electrical resistivity so that eddy currents are not conducted, or are not significantly conducted, from one segmented permanent magnet 33 to the adjacent (e.g. abutting) segmented permanent magnet(s) 33. For example, an air gap between segmented permanent magnets 33 will prevent eddy currents from being conducted between adjacent permanent magnets 33. In case an air gap is utilized to electrically isolate two adjacent (segmented) permanent magnets, it is preferably that the air gap is at least 0.1 mm, preferably at least 0.2 mm. In the alternative, an electrically-isolating (electrically-insulating) solid material may be disposed between the materials of adjacent segmented permanent magnets 33. In one embodiment, the electrically-isolating solid material may be a polymer material, such as an epoxy resin or varnish, that is coated on at least abutting sides of the permanent magnets, preferably on all sides. In case an electrically-isolating material is utilized to electrically isolate two adjacent (segmented) permanent magnets, it is preferably that the electrically-isolating material has a thickness of at least 0.1 mm, preferably at least 0.2 mm, preferably at least 0.3 mm. In another embodiment, the electrically-isolating solid material may be a metal plating, such as a nickel plating, that has sufficient asperities or roughness so that electrical conduction between two abutting segmented permanent magnets 33 is at least substantially prevented or blocked or inhibited (e.g., owing to the presence of minute air gaps between abutting segmented permanent magnets 33). In any of the embodiments, it is preferable that the electrical resistance between two adjacent (e.g., abutting) segmented permanent magnets 33 is at least 1,000 ohms, preferably at least 10,000 ohms, preferably at least 100,000 ohms. If the permanent magnets 33 are prone to corrosion, it is preferable to use an electrically-isolating (electrically-insulating) solid material, such as metal plating and/or synthetic resin coating, that encapsulates the permanent magnets 33.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved electric work machines, such as outdoor power equipment and power tools that utilize an electric motor as its drive source.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Related U.S. patent application Ser. No. 17/890,434, naming the same inventor and the same applicant, discloses additional subject matter relating to the present teachings. The specification, claims, abstract and drawings of U.S. patent application Ser. No. 17/890,434 are therefore completely incorporated herein by reference.

EXPLANATION OF THE REFERENCE NUMBERS

1 Electric work machine
2 Housing

2A Motor-housing part
2B Battery-holding part
2C Rear-grip part
3 Front-grip part
4 Hand guard
5 Battery-mounting part
6, 6a Motors
7 Trigger switch
8 Trigger-lock lever
9 Guide bar
10 Saw chain (output part)
11 Controller
12 Battery pack
17 Fan
18 Screw
19 Through hole
20 Stator
21 Stator core
21A Yoke
21T Tooth
21U Pole arc
22 Front insulator
22D Screw hole
22P Protruding part
22S Support part
22T Protruding part
23 Rear insulator
23T Protruding part
24 Coil
24U U-phase coil
24U1 U-phase coil
24U2 U-phase coil
24V V-phase coil
24V1 V-phase coil
24V2 V-phase coil
24W W-phase coil
24W1 W-phase coil
24W2 W-phase coil
25 Power-supply line
25U U-phase power-supply line
25V V-phase power-supply line
25W W-phase power-supply line
26 Fusing terminal
26U U-phase fusing terminal
26V V-phase fusing terminal
26W W-phase fusing terminal
27 Short-circuiting member
27A Opening
27U U-phase short-circuiting member
27V V-phase short-circuiting member
27W W-phase short-circuiting member
28 Insulating member
28A Body part
28B Screw-boss part
28C Support part
28D Opening
29 Connection wire
29E Winding-end portion
29S Winding-start portion
30 Rotor
31 Rotor core
31B Bridge part
31F Front-end part
31R Rear-end part
31S Outer surface
31W Partition wall
32 Rotor shaft
33 Permanent magnet
34 Magnetic-pole part
34N First magnetic-pole part
34S Second magnetic-pole part
37 Shaft opening
40 Sensor board
41 Plate part
42 Screw-boss part
43 Magnetic sensor
44 Signal line
45 Opening
50 Magnet hole
51 Outer-side support surface
51E Edge
71 Gap
73 Resin
119 Hole
Ca Virtual circle
Da Submerged amount
Dr Outer diameter
La First virtual line
Lr Second virtual line (reference line)

The invention claimed is:

1. An electric work machine comprising:
a brushless motor comprising a stator disposed around a rotor; and
an output part configured to be directly or indirectly driven by the rotor;
wherein:
the rotor comprises a rotor core and a plurality of magnetic-pole parts disposed around a circumferential direction of the rotor core;
the stator comprises: a stator core; one or more insulators fixed to the stator core; and coils, which are respectively wound on teeth of the stator core via the insulator(s);
the magnetic-pole parts comprise first magnetic-pole parts and second magnetic-pole parts, which are disposed alternately in the circumferential direction and the magnetic poles of which differ from each other;
each one of the magnetic-pole parts is constituted by a plurality of discrete permanent magnets; and
when the induced voltage of the brushless motor is given as Va, the power-supply voltage of the brushless motor is given as Vb, the rotational speed of the brushless motor is given as $\omega$, a first induced voltage constant, which is expressed by $Va/\omega$, is given as Ea [V/krpm], a pole-pairs count, which is the number of first magnetic-pole parts or of the second magnetic-pole parts, is given as Pi, and a second induced voltage constant, which is expressed as Ea/Pi, is given as Eb [V/krpm·pole-pairs count], the condition below is satisfied:

$$Eb \leq 0.025 \times Vb.$$

2. The electric work machine according to claim 1, wherein, in each one of the magnetic-pole parts, a plurality of the discrete permanent magnets is arranged in an axial direction of the rotor core.

3. The electric work machine according to claim 2, wherein:
each one of the magnetic-pole parts is constituted by at least three of the discrete permanent magnets disposed in the axial direction;
the stator core comprises pole arcs, which protrude in the circumferential direction from radially-inner-end portions of the teeth; and when an opening width, which is the distance between a first one of the pole arcs of a first one of the teeth and a second one of the pole arcs, which is disposed adjacent to the first one of the pole arcs, of a second one of the teeth disposed adjacent to the first one of the teeth, is given as Wa, and a magnet width, which is the dimension of the permanent magnets in a tangential direction of the rotor, is given as Wm, the condition below is satisfied:

$$0.2 \leq Wa/Wm.$$

4. The electric work machine according to claim 2, wherein:
   each one of the magnetic-pole parts is constituted by at least two of the discrete permanent magnets disposed in the axial direction;
   the stator core comprises pole arcs, which protrude in the circumferential direction from radially-inner-end portions of the teeth; and
   when an opening width, which is the distance between a first one of the pole arcs of a first one of the teeth and a second one of the pole arcs, which is disposed adjacent to the first one of the pole arcs, of a second one of the teeth disposed adjacent to the first one of the teeth, is given as Wa, and a magnet width, which is the dimension of the permanent magnets in a tangential direction of the rotor, is given as Wm, the condition below is satisfied:

$$0.3 \leq Wa/Wm.$$

5. The electric work machine according to claim 4, wherein the total number of magnetic-pole parts is six or more.

6. The electric work machine according to claim 5, wherein, when a magnet length, which is the dimension of the permanent magnets in the axial direction of the rotor, is given as Lm and the total number of the magnetic-pole parts is given as Pn, the condition below is satisfied:

$$2 \times (Wm + Lm/Pn) \times Pn \geq 2 \times (Wm/Pn + Lm) \times Pn.$$

7. The electric work machine according to claim 1, wherein, in each one of the magnetic-pole parts, a plurality of the discrete permanent magnets is arranged in the circumferential direction.

8. The electric work machine according to claim 7, wherein:
   each one of the magnetic-pole parts is constituted by at least two of the discrete permanent magnets arranged in the circumferential direction;
   the stator core comprises pole arcs, which protrude in the circumferential direction from radial-inner-end portions of the teeth; and
   when an opening width, which is the distance between a first one of the pole arcs of a first one of the teeth and a second one of the pole arcs, which is disposed adjacent to the first one of the pole arcs, of a second one of the teeth disposed adjacent to the first one of the teeth, is given as Wa, and a magnet width, which is the dimension of the permanent magnets in a tangential direction of the rotor, is given as Wm, the condition below is satisfied:

$$0.2 \leq Wa/Wm.$$

9. The electric work machine according to claim 8, wherein the total number of magnetic-pole parts is six or more.

10. The electric work machine according to claim 9, wherein, when a magnet length, which is the dimension of the permanent magnets in the axial direction of the rotor, is given as Lm and the total number of magnetic-pole parts is given as Pn, the condition below is satisfied:

$$2 \times (Wm/Pn + Lm) \times Pn \geq 2 \times (Wm + Lm/Pn) \times Pn.$$

11. An electric work machine comprising:
    a brushless motor comprising a stator disposed around a rotor; and
    an output part configured to be directly or indirectly driven by the rotor;
    wherein:
    the rotor comprises a rotor core and a plurality of magnetic-pole parts disposed around a circumferential direction of the rotor core;
    the stator comprises: a stator core; one or more insulators fixed to the stator core; and coils, which are respectively wound on teeth of the stator core via the insulator(s);
    the magnetic-pole parts comprise first magnetic-pole parts and second magnetic-pole parts, which are disposed alternately in the circumferential direction and the magnetic poles of which differ from each other;
    the magnetic-pole parts are constituted as permanent magnets, which are disposed in the interior of the rotor core;
    when the total number of magnetic-pole parts is given as Pn and the angle formed between the permanent magnets of the first magnetic-pole parts and the permanent magnets of the second magnetic-pole parts that are adjacent to each other is given as θ, the condition below is satisfied:

$$\theta = 180[°] \times (Pn-2)/Pn; \text{ and}$$

when the induced voltage of the brushless motor is given as Va, the power-supply voltage of the brushless motor is given as Vb, the rotational speed of the brushless motor is given as ω, a first induced voltage constant, which is expressed as Va/ω, is given as Ea [V/krpm], a pole-pairs count, which is the number of first magnetic-pole parts or of the second magnetic-pole parts, is given as Pi, and a second induced voltage constant, which is expressed as Ea/Pi, is given as Eb [V/krpm·pole-pairs count], the condition below is satisfied:

$$Eb \leq 0.025 \times Vb.$$

12. The electric work machine according to claim 11, wherein:
    the rotor core comprises magnet holes, in which the permanent magnets are respectively disposed;
    each of the magnet holes has an outer-side support surface, which faces radially outward and opposes an outer surface of the corresponding permanent magnet;
    in each of the magnet holes, a gap is formed radially outward of the outer-side support surface;
    a bridge part of the rotor core is disposed between the outer surface of the rotor core and a radially-outer-end portion of the gap; and
    when a second virtual line, which extends in a direction parallel to the outer-side support surface and passes through a point of intersection between a virtual circle, which passes through an inner-end portion of the bridge part in the radial direction, and a first virtual line, which passes through an edge of the outer-side support surface such that the first virtual line is orthogonal to the outer-side support surface, is given as reference line Lr, a distance in a radial direction between the reference line Lr and the outer-side support surface is given as submerged amount Da, and an outer diameter of the rotor core is given as Dr, the condition below is satisfied:

$$0.017 \leq Da/Dr.$$

13. The electric work machine according to claim 12, wherein:
the stator core comprises pole arcs, which protrude in the circumferential direction from radially-inner-end portions of the teeth; and
when an opening width, which is the distance between a first one of the pole arcs of a first one of the teeth and a second one of the pole arcs, which is disposed adjacent to the first one of the pole arcs, of a second one of the teeth disposed adjacent to the first one of the teeth, is given as Wa, and a magnet width, which is the dimension of the permanent magnets in a tangential direction of the rotor, is given as Wm, the condition below is satisfied:

$$0.2 \leq Wa/Wm.$$

14. The electric work machine according to claim 13, wherein the total number of magnetic-pole parts is six or more.

15. An electric work machine comprising:
a brushless motor comprising a stator disposed around a rotor; and
an output part configured to be directly or indirectly driven by the rotor;
wherein:
the rotor comprises a rotor core and a plurality of magnetic-pole parts disposed in a circumferential direction of the rotor core;
the stator comprises: a stator core; one or more insulators fixed to the stator core; and coils, which are respectively wound on teeth of the stator core via the insulator(s);
the magnetic-pole parts comprise first magnetic-pole parts and second magnetic-pole parts, which are disposed alternately in the circumferential direction and the magnetic poles of which differ from each other;
the magnetic-pole parts are constituted by permanent magnets, which are fixed to the rotor core;
the rotor core has: a shaft opening, in which a rotor shaft is disposed; and a plurality of holes formed in a radial direction between the shaft opening and an outer surface of the rotor core; and
when the induced voltage of the brushless motor is given as Va, the power-supply voltage of the brushless motor is given as Vb, the rotational speed of the brushless motor is given as ω, a first induced voltage constant, which is expressed by Va/ω, is given as Ea [V/krpm], a pole-pairs count, which is the number of first magnetic-pole parts or the second magnetic-pole parts, is given as Pi, and a second induced voltage constant, which is expressed as Ea/Pi, is given as Eb [V/krpm·pole-pairs count], the condition below is satisfied:

$$Eb \leq 0.025 \times Vb.$$

16. The electric work machine according to claim 15, wherein each one of the magnetic-pole parts is constituted by a plurality of discrete permanent magnets.

17. The electric work machine according to claim 15, wherein:
the stator core comprises pole arcs, which protrude in the circumferential direction from radially-inner-end portions of the teeth; and
when an opening width, which is the distance between a first one of the pole arcs of a first one of the teeth and a second one of the pole arcs, which is disposed adjacent to the first one of the pole arcs, of a second one of the teeth disposed adjacent to the first one of the teeth, is given as Wa, and a magnet width, which is the dimension of the permanent magnets in a tangential direction of the rotor, is given as Wm, the condition below is satisfied:

$$0.2 \leq Wa/Wm.$$

18. The electric work machine according to claim 16, wherein the total number of magnetic-pole parts is six or more.

19. The electric work machine according to claim 1, wherein the total number of magnetic-pole parts is larger than the total number of coils.

20. The electric work machine according to claim 1, wherein:
the total number of magnetic-pole parts is eight; and
the total number of coils is six.

* * * * *